United States Patent
Ludwig

(10) Patent No.: US 7,039,252 B2
(45) Date of Patent: May 2, 2006

(54) ITERATIVE APPROXIMATION ENVIRONMENTS FOR MODELING THE EVOLUTION OF AN IMAGE PROPAGATING THROUGH A PHYSICAL MEDIUM IN RESTORATION AND OTHER APPLICATIONS

(76) Inventor: Lester F. Ludwig, 812 Sovereign Way, Redwood Shores, CA (US) 94065

( * ) Notice: Subject to any disclaimer, the term of this patent is extended or adjusted under 35 U.S.C. 154(b) by 18 days.

(21) Appl. No.: 10/980,744

(22) Filed: Nov. 2, 2004

(65) Prior Publication Data
US 2005/0089243 A1     Apr. 28, 2005

Related U.S. Application Data

(63) Continuation-in-part of application No. 10/665,439, filed on Sep. 18, 2003, which is a continuation-in-part of application No. 09/512,775, filed on Feb. 25, 2000, now Pat. No. 6,687,418.

(60) Provisional application No. 60/121,680, filed on Feb. 25, 1999, provisional application No. 60/121,958, filed on Feb. 25, 1999.

(51) Int. Cl.
*G06K 9/36*       (2006.01)
*G03H 1/16*       (2006.01)

(52) U.S. Cl. ......................... 382/280; 359/29
(58) Field of Classification Search ........... 382/254, 382/274, 275, 280, 312; 359/29, 31, 279, 359/560; 709/232
See application file for complete search history.

(56) References Cited

U.S. PATENT DOCUMENTS

3,519,331 A     7/1970  Cutrona et al.
3,697,149 A  *  10/1972 Van Heeckeren et al. .. 369/103

(Continued)

FOREIGN PATENT DOCUMENTS

JP       05-066377       3/1993

OTHER PUBLICATIONS

Sumiyoshi Abe, et al., "An optical implementation for the estimation of the fractional-Fourier order", Optics Communications 137 (May 1, 1997), 214-218.

(Continued)

*Primary Examiner*—Kanjibhai Patel
(74) *Attorney, Agent, or Firm*—Jeff Lotspeich

(57) ABSTRACT

Image processing utilizing numerical calculation of fractional exponential powers of a diagonalizable numerical transform operator for use in an iterative or other larger computational environments. In one implementation, a computation involving a similarity transformation is partitioned so that one part remains fixed and may be reused in subsequent iterations. The numerical transform operator may be a discrete Fourier transform operator, discrete fractional Fourier transform operator, centered discrete fractional Fourier transform operator, and other operators, modeling propagation through physical media. Such iterative environments for these types of numerical calculations are useful in correcting the focus of misfocused images which may originate from optical processes involving light (for example, with a lens or lens system) or from particle beams (for example, in electron microscopy or ion lithography).

46 Claims, 19 Drawing Sheets

U.S. PATENT DOCUMENTS

| | | | |
|---|---|---|---|
| 4,189,214 A * | 2/1980 | Matsui et al. ............... 359/761 |
| 4,572,616 A | 2/1986 | Kowel et al. |
| 5,016,976 A | 5/1991 | Horner et al. |
| 5,061,046 A | 10/1991 | Lee et al. |
| 5,323,472 A | 6/1994 | Falk |
| 5,416,618 A | 5/1995 | Juday |
| 5,426,521 A | 6/1995 | Chen et al. |
| 5,432,336 A | 7/1995 | Carangelo et al. |
| 5,544,252 A | 8/1996 | Iwaki et al. |
| 5,706,139 A | 1/1998 | Kelly |
| 5,815,233 A | 9/1998 | Morokawa et al. |
| 5,854,710 A * | 12/1998 | Rao et al. ................... 359/559 |
| 5,859,728 A | 1/1999 | Colin et al. |
| 5,959,776 A | 9/1999 | Pasch |
| 6,011,874 A * | 1/2000 | Gluckstad ................... 382/276 |
| 6,021,005 A | 2/2000 | Cathey, Jr. et al. |
| 6,091,481 A * | 7/2000 | Mori ........................... 355/67 |
| 6,229,649 B1 | 5/2001 | Woods et al. |
| 6,252,908 B1 | 6/2001 | Tore |
| 6,392,740 B1 * | 5/2002 | Shiraishi et al. ............... 355/53 |
| 6,404,553 B1 | 6/2002 | Wootton et al. |
| 6,421,163 B1 * | 7/2002 | Culver et al. ............... 359/279 |
| 6,505,252 B1 | 1/2003 | Nagasaka |

OTHER PUBLICATIONS

N. I. Achieser, Theory of Approximation, Dover, New York, 1992. pp. 1-23 & 78-81.

Jun Amako, et al., "Kinoform using an electrically controlled birefringent liquid-crystal spatial light modulator", Applied Optics, vol. 30, No. 32, Nov. 10, 1991, pp. 4622-4628.

V. Bargmann, "On a Hilbert Space of Analytical Functions and an Associated Integral Transform," Comm. Pure Appl. Math, vol. 14, 1961, 187-214.

L. M. Bernardo, O. D. D. Soares, "Fractional Fourier Transforms and Imaging," Journal of Optical Society of America, vol. 11, No. 10, Oct. 1994. pp. 2622-2625.

Philip M. Birch, et al., "Real-time optical aberration correction with a ferroelectric liquid-crystal spatial light modulator", Applied Optics, vol. 37, No. 11, Apr. 10, 1998, pp. 2164-2169.

Y. Bitran, H. M. Ozaktas, D. Mendlovic, R.G.Dorsch, A. W. Lohmann, "Fractional Fourier Transform: Simulations and Experimental Results," Applied Optics vol. 34 No. 8, Mar. 1995, pp. 1329-1332.

E.U. Condon, "Immersion of the Fourier Transform in a Continuous Group of Functional Transforms," in Proceedings of the National Academy of Science, vol. 23, pp. 158-161, 1937.

P. J. Davis, Interpolation and Approximation, Dover, New York, 1975. pp. 24-55, 106-185, 328-340.

B. W. Dickinson and D. Steiglitz, "Eigenvectors and Functions of the Discrete Fourier Transform," in IEEE Transactions on Acoustics, Speech, and Signal Processing, vol. ASSP-30, No. 1, Feb. 1982.

R. Dorsch, "Fractional Fourier Transformer of Variable Order Based on a Modular Lens System," in Applied Optics, vol. 34, No. 26, pp. 6016-6020, Sep. 1995.

M. Fatih Erden, et al., "Design of dynamically adjustable ananmorphic fractional Fourier transformer", Optics Communications 136 (Mar. 1, 1996), pp. 52-60.

M. F. Erden, "Repeated Filtering in Consecutive Fractional Fourier Domains," doctoral dissertation at Bilkent Univ., Aug. 18, 1997.

G. B. Folland, Harmonic Analysis in Phase Space, Princeton University Press, Princeton, NJ, 1989. pp. 51-55, 223-224, 236-239, 193.

J. W. Goodman, Introduction to Fourier Optics, McGraw-Hill, New York, 1968. pp. 77-197.

E. Hecht, "Grin-Systems", Optics. Third Edition, Ch. 6, section 6.4, pp. 277-280, Addison-Wesley publishing, (c) 1998.

K. Iizuka, Engineering Optics, Second Edition, Springer-Verlag, 1987. pp. 238-311.

Sang-Ii Jin, et al., "Generalized Vander Lugt Correlator with fractional Fourier transforms for optical pattern recognition systems", Lasers and Electro-Optics, 1997, CLEO/Pacific Rim, Pacific Rim Conf. on. p. 311.

F. H. Kerr, "A Distributional Approach to Namias' Fractional Fourier Transforms," in Proceedings of the Royal Society of Edinburgh, vol. 108A, pp. 133-143, 1983.

F. H. Kerr, "On Namias' Fractional Fourier Transforms," in IMA J. of Applied Mathematics vol. 39, No. 2, pp. 159-175, 1987.

M. A. Kutay, M. F. Erden, H.M. Ozatkas, O. Arikan, C. Candan, O. Guleryuz, "Cost-effective Approx. of Linear Systems with Repeated and Multi-channel Filtering Configurations," IEEE pp 3433-3436, May 12, 1998.

M. A. Kutay, "Generalized Filtering Configurations with Applications in Digital and Optical Signal and image Processing," doctoral dissertation at Bilkent Univ. Feb. 24, 1999.

M. A. Kutay, M. F. Erden, H.M. Ozatkas, O. Arikan, C. Candan, O. Guleryuz, "Space-bandwidth-efficient Realizations of Linear Systems," Optics Letters, vol. 23 No. 14, Jul. 15, 1998. pp. 1069-1071.

N. N. Lebedev, Special Functions and their Applications, Dover, New York, 1965. pp. 60-77.

L. Levi, Applied Optics, vol. 2 (Sec. 19.2), Wiley, New York, 1980.

Adolf W. Lohmann, "A fake zoom lens for fractional Fourier experiments", Optics Communications 115 (Apr. 1, 1995) 437-443.

L. F. Ludwig, "General Thin-Lens Action on Spatial Intensity (Amplitude) Distribution Behaves as Non-Integer Powers of Fourier Transform," Spatial Light Modulators and Applications Conference, South lake Tahoe, 1988.

M. E. Marhic, "Roots of the Identity Operator and Optics," Journal of Optical Society of America, vol. 12, No. 7, Jul. 1995. pp. 1448-1459.

V. Namias, "The Fractional Order Fourier Transform and its Application to Quntum Mechanics," in J. of Institute of Mathematics and Applications, vol. 25, pp. 241-265, 1980.

H. M. Ozakas, "Digital Computation of the Fractional Fourier Transform," IEEE Transactions on Signal Processing, vol. 44, No. 9, pp. 2141-2150, Sep. 1996.

H. M. Ozaktas, D. Mendlovic, "Every Fourier Optical System is Equivalent to Consecutive Fractional-Fourier-domain Filtering," Applied Optics, vol. 35, No. 17, Jun. 1996. pp. 3167-3170.

H. M. Ozaktis, D. Mendlovic, "Fourier Transforms of Fractional Order and their Optical Interpretation," Optics Communications, vol. 101, No. 3, 4 pp. 163-169.

H. M. Ozaktas, D. Mendlovic, "Fractional Fourier Transforms and their Optical Implementation I," Journal of the Optical Society of America, A vol. 10, No. 9, pp. 1875-1881, Sep. 1993.

H. M. Ozaktas, D. Mendlovic, "Fractional Fourier Transforms and their Optical Implementation II," Journal of the Optical Society of America, A vol. 10, No. 12, pp. 2522-2531, Dec. 1993.

H. M. Ozaktas, M. A. Kutay, O. Arikan, L. Onural, "Optimal filtering in Fractional Fourier Domains," IEEE Transactions on Signal Processing, vol. 45, No. 5, pp. 1129-1143, May 1997.

H. M. Ozaktas, H. Ozaktas, M. A. Kutay, O. Arikan, M. F. Erden, "Solution and Cost Analysis of General Multi-channel and Multi-stage Filtering Circuits," IEEE, Piscataway, N. J., pp 481-484, Oct. 1998.

H. M. Ozaktas, H. Ozaktas, M. A. Kutay, O. Arikan, "The Fractional Fourier Domain Decomposition (FFDD)," Signal Processing, 1999. 4 pgs.

A. Papoulis, "Systems and Transforms with Applications in Optics," Krieger, Malabar, Florida, 1986. pp. 1, 344-355, 410-421, 430-435.

S. Thangavelu, "Lectures on Hermite and Laguerre Expansions," Princeton University Press, Princeton, New Jersey, 1993. pp. 1-23, 84-91, 110-119.

N. Wiener, "The Fourier Integral and Certain of Its Applications," (Dover Publications, Inc., New York, 1958) originally Cambridge University Press, Cambridge, England, 1933. pp. 46-71.

"Taking the Fuzz out of Photos," Newsweek, vol. CXV, No. 2, Jan. 8, 1990.

S.-C. Pei, M.-H. Yeh et al., "Discrete Fractional Fourier Transform Based on Orthogonal Projections", from *IEEE Transactions on Signal Processing*, vol. 47(#5), IEEE Computer Society Press, 1999.

S.-C. Pei et al., "Closed-Form Discrete Fractional and Affine Fourier Transforms", from *IEEE Transactions on Signal Processing*, vol. 48(#5), IEEE Computer Society Press, May 2000.

C. Candan, et al., "The Discrete Fractional Fourier Transform", from IEEE Transactions on Signal Processing, vol. 48(#5), pp. 1329-1337, IEEE Computer Society Press, 2000.

J. Garcia et al., "Fractional Fourier-Transform Calculuation through the Fast Fourier Transform Algorithm," Applied Optics, vol. 35 No. 35, Dec. 10, 1996.

Soo-Chang Pei et al., "A New Discrete Fractional Fourier Transform Based on Constrained Eigendecomposition of DFT Matrix by Largrange Multiplier Method," from IEEE Transactions on Circuits and Systems-II: Analog and Digital Signal Processing, vol. 46, No. 9, pp. 1240-1245, Sep. 1999.

Soo-Chang Pei et al., "Two Dimensional Discrete Fractional Fourier Transform," from Signal Processing, vol. 67, pp. 99-108, 1998.

B. Santhanam et al., "The DRFT-A Rotation in Time-Frequency Space," from IEEE The 1995 International Conference on Acoustics, Speech, and Signal Processing—Conference Proceedings, vol. 2, pp. 921-924, May 9-12, 1995.

L. Yaroslavskii, "Shifted Discrete Fourier Transformations," in Problems of Information Transmission (Russian Translation) vol. 15, No. 4, pp. 324-327, Apr. 1980; Problemy Peredachi Informatsii (Russian Original), vol. 15, No. 4, pp. 247-338, Oct.-Dec. 1979.

G. Bonnerot et al., "Odd-Time Odd-Frequency Discrete Fourier Transform for Symmetric Real-Valued Series," in Proceedings of the IEEE, vol. 64-No. 3, pp. 392-393, Mar. 1976.

J. Vernet, "Real Signals Fast Fourier Transform: Storage Capacity and Step Number Reduction by Means of an Odd Discrete Fourier Transform," in Proceedings of the IEEE Letters, vol. 59, No. 10, pp. 1531-1532, Oct. 1971.

Soo-Chang Pei et al., "Eigenfunctions of the Offset Fourier, fractional Fourier, and Linear Canonical Transforms," J. Opt. Soc. Am. A, Issue 3 Mar. 2003, pp 522-532.

* cited by examiner

901

$$F^\alpha = (\,|F^\alpha|\; \angle F^\alpha\,)$$

FrFT Operator | Amplitude component | Phase component

902

Optics → Math Correction → Corrected Result $$F^{2-\varepsilon} \cdot F^{\varepsilon} = F^2$$

903

Optics → Math Correction → Corrected Result $$(\,|F^{2-\varepsilon}|\; \angle F^{2-\varepsilon}\,) \cdot (\,|F^{\varepsilon}|\; \angle F^{\varepsilon}\,) = F^2$$

904

Amplitude Only Image → Math Correction → Corrected Result $$(\,|F^{2-\varepsilon}|\qquad) \cdot (\,|F^{\varepsilon}|\; \angle F^{\varepsilon}\,) \neq F^2$$

⎵ Missing phase information

905

Amplitude Only Image → Phase-Restored Math Correction → Corrected Result $$(\,|F^{2-\varepsilon}|\,) \cdot (\,\angle F^{2-\varepsilon}\;|F^{\varepsilon}|\;\angle F^{\varepsilon}\,) = F^2$$

$$(\,\angle F^{2-\varepsilon} \quad F^{\varepsilon}\,)$$

FIG. 9

$$C = P \Lambda^\alpha P^{-1} U$$

- 1105: C
- 1104: $P^{-1}$ (rightmost P with -1... actually labels: 1104, 1103, 1102, 1101 from left to right over $\Lambda^\alpha$... )

1110: "Vector-scaled" Matrix or tensor operation

1114: Matrix or tensor multiply

1112: Matrix or tensor multiply

FIG. 14

$$\frac{1}{\sqrt{L}} \begin{bmatrix} 1 & 1 & 1 & \cdots & 1 \\ 1 & e^{2\pi i/L} & e^{4\pi i/L} & \cdots & e^{2\pi i(L-1)/L} \\ 1 & e^{4\pi i/L} & e^{8\pi i/L} & \cdots & e^{4\pi i(L-1)/L} \\ \vdots & \vdots & \vdots & & \vdots \\ 1 & e^{2\pi i(L-1)/L} & e^{4\pi i(L-1)/L} & \cdots & e^{2\pi i(L-1)^2/L} \end{bmatrix}$$

FIG. 15

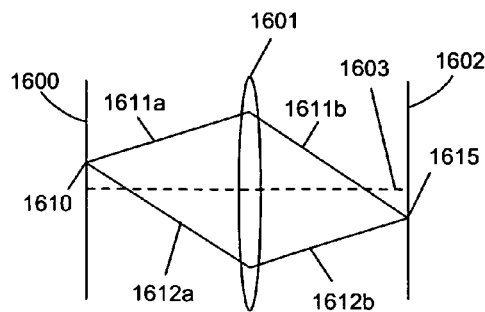
FIG. 16A
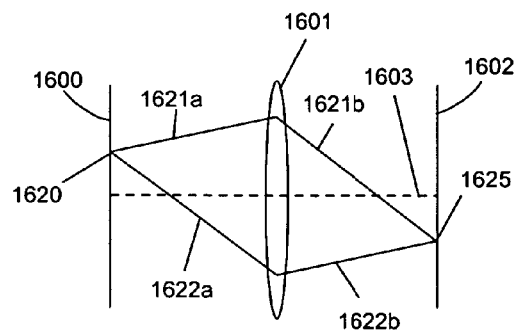
FIG. 16B
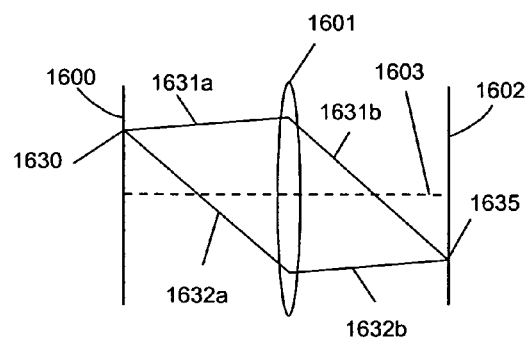
FIG. 16C
FIG. 16D
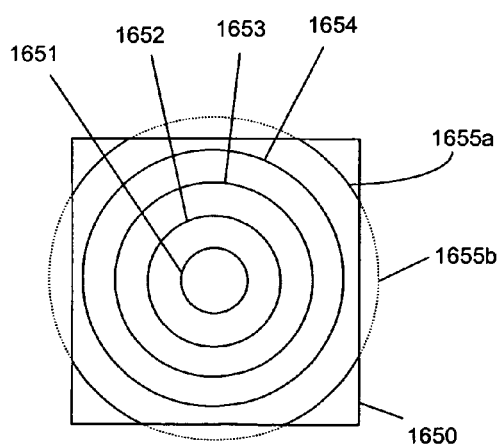

$$\frac{1}{\sqrt{L}} \begin{bmatrix} e^{2\pi i \left(\frac{L-1}{2}\right)^2/L} & \cdots & e^{4\pi i \left(\frac{L-1}{2}\right)/L} & e^{2\pi i \left(\frac{L-1}{2}\right)/L} & 1 & e^{-2\pi i \left(\frac{L-1}{2}\right)/L} & e^{-4\pi i \left(\frac{L-1}{2}\right)/L} & \cdots & e^{-2\pi i \left(\frac{L-1}{2}\right)^2/L} \\ \vdots & \ddots & \vdots & \vdots & \vdots & \vdots & \vdots & \ddots & \vdots \\ e^{4\pi i \left(\frac{L-1}{2}\right)/L} & \cdots & e^{8\pi i/L} & e^{4\pi i/L} & 1 & e^{-4\pi i/L} & e^{-8\pi i/L} & \cdots & e^{-4\pi i \left(\frac{L-1}{2}\right)/L} \\ e^{2\pi i \left(\frac{L-1}{2}\right)/L} & \cdots & e^{4\pi i/L} & e^{2\pi i/L} & 1 & e^{-2\pi i/L} & e^{-4\pi i/L} & \cdots & e^{-2\pi i \left(\frac{L-1}{2}\right)/L} \\ 1 & \cdots & 1 & 1 & 1 & 1 & 1 & \cdots & 1 \\ e^{-2\pi i \left(\frac{L-1}{2}\right)/L} & \cdots & e^{-4\pi i/L} & e^{-2\pi i/L} & 1 & e^{2\pi i/L} & e^{4\pi i/L} & \cdots & e^{2\pi i \left(\frac{L-1}{2}\right)/L} \\ e^{-4\pi i \left(\frac{L-1}{2}\right)/L} & \cdots & e^{-8\pi i/L} & e^{-4\pi i/L} & 1 & e^{4\pi i/L} & e^{8\pi i/L} & \cdots & e^{4\pi i \left(\frac{L-1}{2}\right)/L} \\ \vdots & \ddots & \vdots & \vdots & \vdots & \vdots & \vdots & \ddots & \vdots \\ e^{-2\pi i \left(\frac{L-1}{2}\right)^2/L} & \cdots & e^{-4\pi i \left(\frac{L-1}{2}\right)/L} & e^{-2\pi i \left(\frac{L-1}{2}\right)/L} & 1 & e^{2\pi i \left(\frac{L-1}{2}\right)/L} & e^{4\pi i \left(\frac{L-1}{2}\right)/L} & \cdots & e^{2\pi i \left(\frac{L-1}{2}\right)^2/L} \end{bmatrix}$$

ITERATIVE APPROXIMATION ENVIRONMENTS FOR MODELING THE EVOLUTION OF AN IMAGE PROPAGATING THROUGH A PHYSICAL MEDIUM IN RESTORATION AND OTHER APPLICATIONS

CROSS REFERENCE TO RELATED APPLICATIONS

This application is a continuation-in-part (CIP) of U.S. application Ser. No. 10/665,439, filed Sep. 18, 2003, which is a CIP application of U.S. application Ser. No. 09/512,775, filed Feb. 25, 2000, now U.S. Pat. No. 6,687,418, which claims benefit of priority of U.S. provisional applications Ser. Nos. 60/121,680 and 60/121,958, each filed on Feb. 25, 1999.

BACKGROUND OF THE INVENTION

1. Field of the Invention

This invention relates to optical signal processing, and more particularly to the use of fractional Fourier transform properties of lenses to correct the effects of lens misfocus in photographs, video, and other types of captured images.

2. Discussion of the Related Art

A number of references are cited herein; these are provided in a numbered list at the end of the detailed description of the preferred embodiments. These references are cited at various locations throughout the specification using a reference number enclosed in square brackets.

The Fourier transforming properties of simple lenses and related optical elements is well known and heavily used in a branch of engineering known as Fourier optics [1, 2]. Classical Fourier optics [1, 2, 3, 4] utilize lenses or other means to obtain a two-dimensional Fourier transform of an optical wavefront, thus creating a Fourier plane at a particular spatial location relative to an associated lens. This Fourier plane includes an amplitude distribution of an original two-dimensional optical image, which becomes the two-dimensional Fourier transform of itself. In the far simpler area of classical geometric optics [1, 3], lenses and related objects are used to change the magnification of a two-dimensional image according to the geometric relationship of the classical lens-law. It has been shown that between the geometries required for classical Fourier optics and classical geometric optics, the action of a lens or related object acts on the amplitude distribution of images as the fractional power of the two-dimensional Fourier transform. The fractional power of the fractional. Fourier transform is determined by the focal length characteristics of the lens, and the relative spatial separation between a lens, source image, and an observed image.

The fractional Fourier transform has been independently discovered on various occasions over the years [5, 7, 8, 9, 10], and is related to several types of mathematical objects such as the Bargmann transform [8] and the Hermite semigroup [13]. As shown in [5], for example, the most general form of optical properties of lenses and other related elements [1, 2, 3] can be transformed into a fractional Fourier transform representation. This property has apparently been rediscovered some years later and worked on steadily ever since (see for example [6]), expanding the number of optical elements and situations covered. It is important to remark, however, that the lens modeling approach in the latter ongoing series of papers view the multiplicative phase term in the true form of the fractional Fourier transform as a problem or annoyance and usually omit it from consideration.

SUMMARY OF THE INVENTION

Correction of the effects of misfocusing in recorded or real-time image data may be accomplished using fractional Fourier transform operations realized optically, computationally, or electronically. In some embodiments, the invention extends the capabilities of using a power of the fractional Fourier transform for correcting misfocused images, to situations where phase information associated with the original image misfocus is unavailable. For example, conventional photographic and electronic image capture, storage, and production technologies can only capture and process image amplitude information—the relative phase information created within the original optical path is lost. As will be described herein, the missing phase information can be reconstructed and used when correcting image misfocus.

In accordance with embodiments of the invention, a method for approximating the evolution of images propagating through a physical medium is provided by calculating a fractional power of a numerical operator. The numerical operator may be defined by the physical medium and includes a diagonalizable numerical linear operator raised to a power ($\alpha$). The method further includes representing a plurality of images using an individual data array for each of the images. The numerical operator may be represented with a linear operator formed by multiplying an ordered similarity transformation operator (P) by a correspondingly-ordered diagonal operator ($\Lambda$), the result of which is multiplied by an approximate inverse ($P^{-1}$) of the ordered similarity transformation operator (P). Diagonal elements of the correspondingly-ordered diagonal operator ($\Lambda$) may be raised to the power ($\alpha$) to produce a fractional power diagonal operator. The fractional power diagonal operator may be multiplied by an approximate inverse of the ordered similarity transformation operator ($P^{-1}$) to produce a first partial result. In addition, the data array of one of the images may be multiplied by the ordered similarity transformation operator (P) to produce a modified data array. The modified data array may then be multiplied by the first partial result to produce the fractional power of the numerical operator. If desired, the last-two multiplication operations may be repeated for each of a plurality of images.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein:

FIG. 9 shows techniques for computing phase correction determined by the fractional Fourier transform applied to a misfocused image;

FIG. 14 shows a simplified version of the equation depicted in FIG. 11;

FIG. 15 shows an exemplary matrix;

FIGS. 16A through 16C are side views of a propagating light or particle beam;

FIG. 16D is a top view of contours of constant radial displacement with respect to the image center of paths associated with the image propagation of an image;

FIG. 17 shows an exemplary matrix for a centered normalized classical discrete Fourier transform;

DETAILED DESCRIPTION OF THE PREFERRED EMBODIMENTS

In the following description, reference is made to the accompanying drawing figures which form a part hereof, and which show by way of illustration specific embodiments of the invention. It is to be understood by those of ordinary skill in this technological field that other embodiments may be utilized, and structural, electrical, optical, as well as procedural changes may be made without departing from the scope of the present invention.

As used herein, the term "image" refers to both still-images (such as photographs, video frames, video stills, movie frames, and the like) and moving images (such as motion video and movies). Many embodiments of the present invention are directed to processing recorded or real-time image data provided by an exogenous system, means, or method. Presented image data may be obtained from a suitable electronic display such as an LCD panel, CRT, LED array, films, slides, illuminated photographs, and the like. Alternatively or additionally, the presented image data may be the output of some exogenous system such as an optical computer or integrated optics device, to name a few. The presented image data will also be referred to herein as the image source.

If desired, the system may output generated image data having some amount of misfocus correction. Generated image data may be presented to a person, sensor (such as a CCD image sensor, photo-transistor array, for example), or some exogenous system such as an optical computer, integrated optics device, and the like. The entity receiving generated image data will be referred to as an observer, image observation entity, or observation entity.

Figure 2:
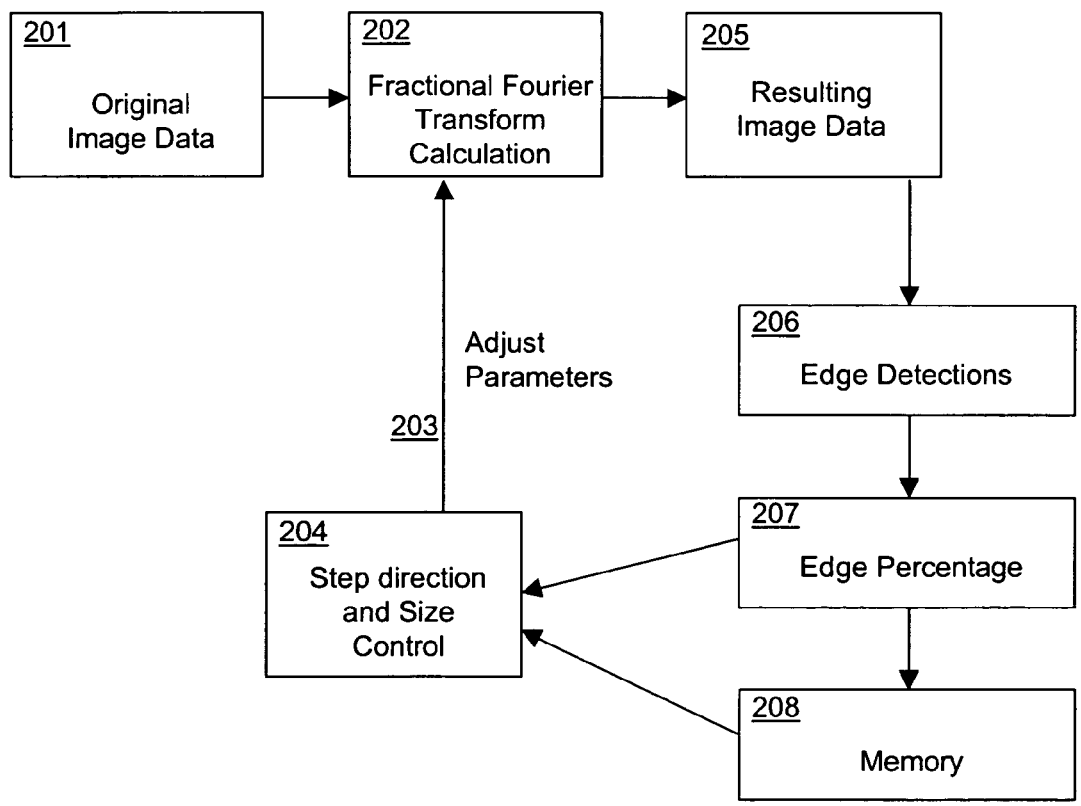
FIG. 2 is a block diagram showing an exemplary approach for automated adjustment of fractional Fourier transform parameters for maximizing the sharp edge content of a corrected image, in accordance with one embodiment of the present invention.
Figure 3:
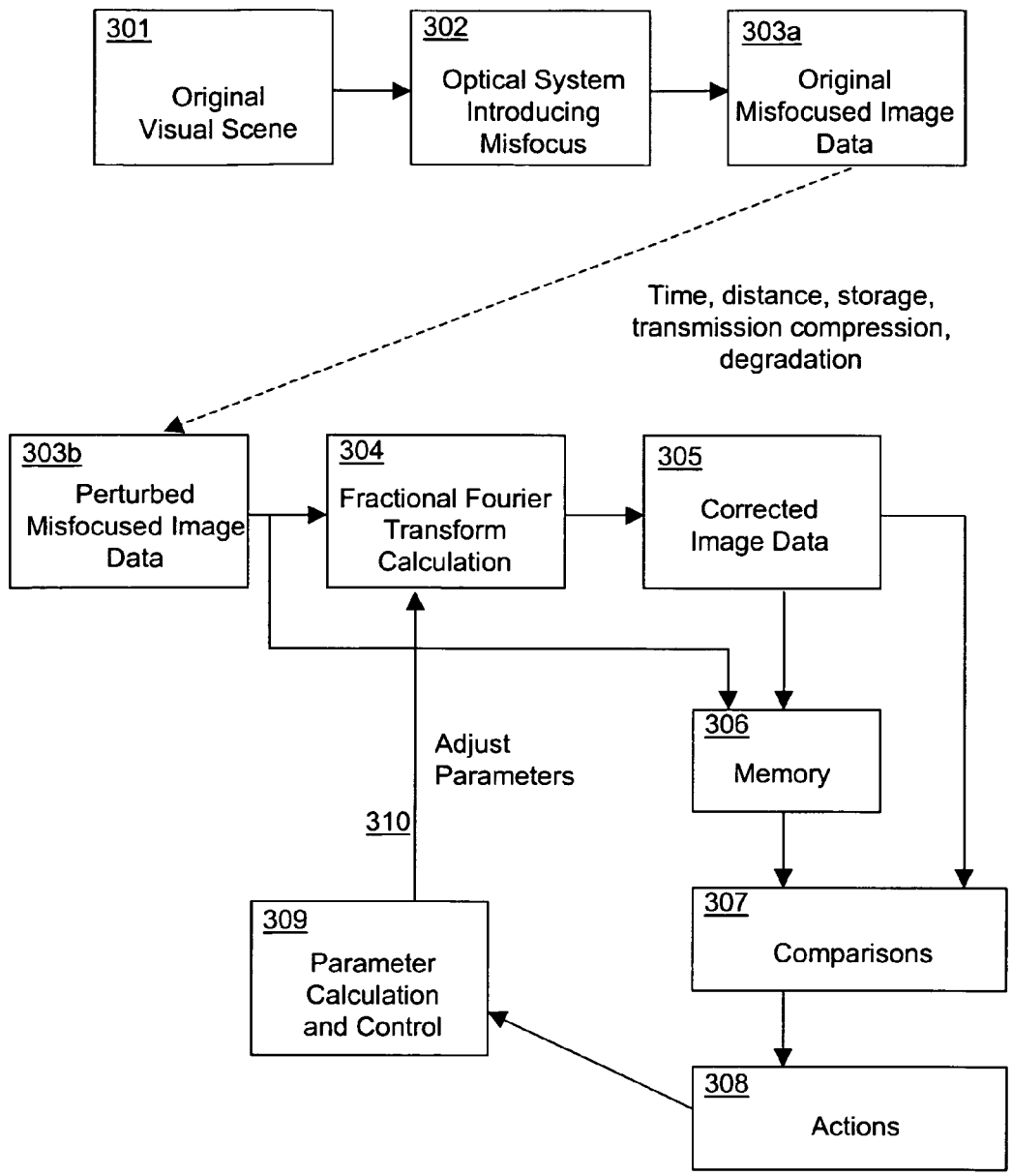
FIG. 3 is a block diagram showing a typical approach for adjusting the fractional Fourier transform parameters to maximize misfocus correction of an image, in accordance with one embodiment of the present invention.

Reference will first be made to FIG. 3 which shows a general approach for adjusting the fractional Fourier transform parameters to maximize the correction of misfocus in an image. Details regarding the use of a fractional Fourier transform (with adjusted parameters of exponential power and scale) to correct image misfocus will be later described with regard to FIGS. 1 and 2.

Original visual scene 301 (or other image source) may be observed by optical system 302 (such as a camera and lens arrangement) to produce original image data 303a. In accordance with some embodiments, optical system 302 may be limited, misadjusted, or otherwise defective to the extent that it introduces a degree of misfocus into the image represented by the image data 303a. It is typically not possible or practical to correct this misfocus effect at optical system 302 to produce a better focused version of original image data 303a. Misfocused original image data 303a may be stored over time or transported over distance. During such a process, the original image data may be transmitted, converted, compressed, decompressed, or otherwise degraded, resulting in an identical or perturbed version of original image data 303b. It is this perturbed version of original image data that may be improved using the misfocus correction techniques disclosed herein. Original and perturbed image data 303a, 303b may be in the form of an electronic signal, data file, photography paper, or other image form.

Original image data 303b may be manipulated numerically, optically, or by other means to perform a fractional Fourier transform operation 304 on the original image data to produce resulting (modified) image data 305. The parameters of exponential power and scale factors of the fractional Fourier transform operation 304 may be adjusted 310 over some range of values, and each parameter setting within this range may result in a different version of resulting image data 305. As the level of misfocus correction progresses, the resulting image data 305 will appear more in focus. The improvement in focus will generally be obvious to an attentive human visual observer, and will typically be signified by an increase in image sharpness, particularly at any edges that appear in the image. Thus a human operator, a machine control system, or a combination of each can compare a sequence of resulting images created by previously selected parameter settings 310, and try a new parameter setting for a yet another potential improvement.

For a human operator, this typically would be a matter of adjusting a control and comparing images side by side (facilitated by non-human memory) or, as in the case of a microscope or telescope, by comparison facilitated purely with human memory. For a machine, a systematic iterative or other feedback control scheme would typically be used. In FIG. 3, each of these image adjustments is generalized by the steps and elements suggested by interconnected elements 306–309, although other systems or methods accomplishing the same goal with different internal structure (for example, an analog electronic circuit, optical materials, or chemical process) are provided for and anticipated by the present invention. For the illustrative general case of FIG. 3, resulting image data 305 for selected parameter settings 310 may be stored in human, machine, or photographic memory 306, along with the associated parameter settings, and compared 307 for the quality of image focus. Based on these comparisons, subsequent high level actions 308 may be chosen.

High level actions 308 typically require translation into new parameter values and their realization, which may be provided by parameter calculation and control 309. This process may continue for some interval of time, some number of resulting images 305, or some chosen or predetermined maximum level of improvement. One or more "best choice" resulting image data set or sets 305 may then be identified as the result of the action and processes depicted in this figure.

With this high level description having been established, attention is now directed to details of the properties and use of a fractional Fourier transform (with adjusted parameters of exponential power and scale) to correct misfocus in an image and maximize correction of misfocus. This aspect of the present invention will be described with regard to FIG. 1.

Figure 1:
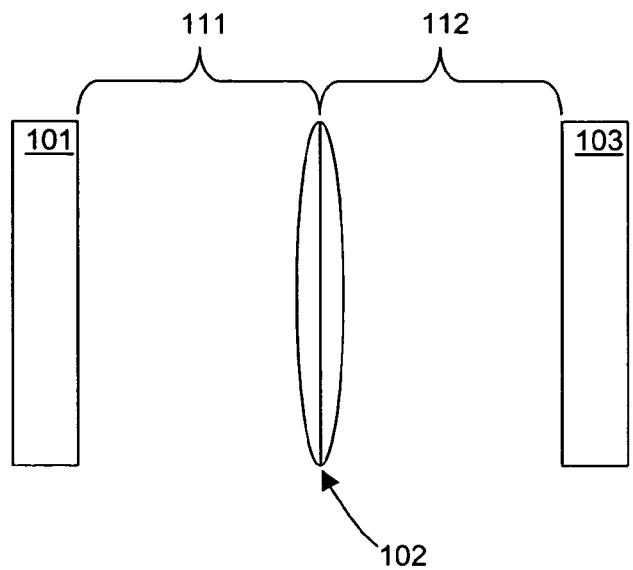
FIG. 1 is a block diagram showing a general lens arrangement and associated image observation entity capable of classical geometric optics, classical Fourier optics, and fractional Fourier transform optics.

FIG. 1 is a block diagram showing image source 101, lens 102, and image observation entity 103. The term "lens" is used herein for convenience, but it is to be understood that the image misfocus correction techniques disclosed herein apply equally to lens systems and other similar optical environments. The image observation entity may be configured with classical geometric optics, classical Fourier optics, or fractional Fourier transform optics. The particular class of optics (geometric, Fourier, or fractional Fourier) implemented in a certain application may be determined using any of the following:

separation distances 111 and 112;

the "focal length" parameter "f" of lens 102;

the type of image source (lit object, projection screen, etc.) in as far as whether a plane or spherical wave is emitted.

As is well known, in situations where the source image is a lit object and where distance 111, which shall be called "a," and distance 112, which shall be called "b," fall into the lens-law relationship, may be determined by the focal length f:

$$\frac{1}{f} = \frac{1}{a} + \frac{1}{b} \tag{1}$$

which gives the geometric optics case. In this case, observed image 103 is a vertically and horizontally inverted version of the original image from source 101, scaled in size by a magnification factor m given by:

$$m = \frac{b}{a} \tag{2}$$

As previously noted, the Fourier transforming properties of simple lenses and related optical elements is also well known in the field of Fourier optics [2, 3]. Classical Fourier optics [2, 3, 4, 5] involve the use of a lens, for example, to take a first two-dimensional Fourier transform of an optical wavefront, thus creating a Fourier plane at a particular spatial location such that the amplitude distribution of an original two-dimensional optical image becomes the two-dimensional Fourier transform of itself. In the arrangement depicted in FIG. 1, with a lit object serving as source image 101, the Fourier optics case may be obtained when a=b=f.

As described in [5], for cases where a, b, and f do not satisfy the lens law of the Fourier optics condition above, the amplitude distribution of source image 101, as observed at observation entity 103, experiences the action of a non-integer power of the Fourier transform operator. As described in [5], this power, which shall be called α, varies between 0 and 2 and is determined by an Arc-Cosine function dependent on the lens focal length and the distances between the lens, image source, and image observer; specifically:

$$\alpha = \frac{2}{\pi} \arccos\left[\operatorname{sgn}(f-a)\frac{\sqrt{(f-a)(f-b)}}{f}\right] \tag{3}$$

for cases where (f−a) and (f−b) share the same sign. There are other cases which can be solved from the more primitive equations in [5] (at the bottom of pages ThE4-3 and ThE4-1). Note simple substitutions show that the lens law relationship among a, b, and f indeed give a power of 2, and that the Fourier optics condition of a=b=f give the power of 1, as required.

The fractional Fourier transform properties of lenses typically cause complex but predictable phase and scale variations. These variations may be expressed in terms of Hermite functions, as presented shortly, but it is understood that other representations of the effects, such as closed-form integral representations given in [5], are also possible and useful.

Various methods can be used to construct the fractional Fourier transform, but to begin it is illustrative to use the orthogonal Hermite functions, which as eigenfunctions diagonalize the Fourier transform [17]. Consider the Hermite function [16] expansion [17, and more recently, 18] of the two dimensional image amplitude distribution function. In one dimension, a bounded (i.e., non-infinite) function k(x) can be represented as an infinite sum of Hermite functions $\{h_n(x)\}$ as:

$$k(x) = \sum_{n=0}^{\infty} a_n h_n(x) \tag{4}$$

Since the function is bounded, the coefficients $\{a_n\}$ eventually become smaller and converge to zero. An image may be treated as a two dimensional entity (for example, a two-dimensional array of pixels), or it can be the amplitude variation of a translucent plate; in either case, the function may be represented in a two-dimensional expansion such as:

$$k(x_1, x_2) = \sum_{m=0}^{\infty} \sum_{n=0}^{\infty} a_{n,m} h_n(x_1) h_m(x_2) \tag{5}$$

For simplicity, the one dimensional case may be considered. The Fourier transform action on Hermite expansion of the function k(x) with series coefficients $\{a_n\}$ is given by [16]:

$$F[k(x)] = \sum_{n=0}^{\infty} (-i)^n a_n h_n(x) \tag{6}$$

Because of the diagonal eigenfunction structure, fractional powers of the Fourier transform operator may be obtained by taking the fractional power of each eigenfunction coefficient. The eigenfunction coefficients here are $(-i)^n$. Complex branching artifact ambiguities that arise from taking the roots of complex numbers can be avoided by writing $(-i)$ as:

$$e^{-i\pi/2} \tag{7}$$

Thus for a given power $\alpha$, the fractional Fourier transform of the Hermite expansion of the function k(x) with series coefficients $\{a_n\}$ can be given by [5]:

$$F^\alpha[k(x)] = \sum_{n=0}^{\infty} e^{-in\pi\alpha/2} a_n h_n(x) \tag{8}$$

Note when $\alpha=1$, the result is the traditional Fourier transform above, and when $\alpha=2$, the result may be expressed as:

$$F^2[k(x)] = \tag{9}$$
$$\sum_{n=0}^{\infty} e^{-in\pi} a_n h_n(x) = \sum_{n=0}^{\infty} (-1)^n a_n h_n(x) = \sum_{n=0}^{\infty} a_n h_n(-x) = k(-x)$$

due to the odd and even symmetry, respectively, of the odd and even Hermite functions. This is the case for the horizontally and vertically inverted image associated with the lens law of geometric optics, although here the scale factors determining the magnification factor have been normalized out.

More generally, as the power $\alpha$ varies (via the Arccosine relationship depending on the separation distance), the phase angle of the $n^{th}$ coefficient of the Hermite expansion varies according to the relationship shown above and the scale factor may vary as well [5]. For images, all of the above occurs in the same manner but in two dimensions [5].

Through use of the Mehler kernel [16], the above expansion may be represented in closed form as [5]:

$$F^\alpha[k(x)] = \tag{10}$$
$$\sqrt{\frac{e^{-\pi\alpha i/2}}{i\sin(\pi\alpha/2)}} \int_{-\infty}^{\infty} k(x) e^{2\pi i\left[\left(\frac{x^2+y^2}{2}\right)\cot\left(\frac{\pi\alpha}{2}\right) - xy\csc\left(\frac{\pi\alpha}{2}\right)\right]} dx$$

Note in [5] that the factor of i multiplying the sin function under the radical has been erroneously omitted. Clearly, both the Hermite and integral representations are periodic in $\alpha$ with period four. Further, it can be seen from either representation that:

$$F^{2\pm\epsilon}[k(x)] = F^2 F^{\pm\epsilon}[k(x)] = F^{\pm\epsilon} F^2[k(x)] = F^{\pm\epsilon}[k(-x)] \tag{11}$$

which illustrates an aspect of the invention as the effect $\epsilon$ will be the degree of misfocus introduced by the misfocused lens, while the Fourier transform raised to the second power represents the lens-law optics case. In particular, the group property makes it possible to calculate the inverse operation to the effect induced on a record image by a misfocused lens in terms of explicit mathematical operations that can be realized either computationally, by means of an optical system, or both. Specifically, because the group has period 4, it follows that $F^{-2}=F^2$; thus:

$$(F^{2\pm\epsilon}[k(x)])^{-1} = F^{-2}F^{\mp\epsilon}[k(x)] = F^2 F^{\mp\epsilon}[k(x)] =$$
$$F^{\mp\epsilon}F^2[k(x)] = F^{\mp\epsilon}[k(-x)] \tag{12}$$

Thus, one aspect of the invention provides image misfocus correction, where the misfocused image had been created by a quality though misfocused lens or lens-system. This misfocus can be corrected by applying a fractional Fourier transform operation; and more specifically, if the lens is misfocused by an amount corresponding to the fractional Fourier transform of power $\epsilon$, the misfocus may be corrected by applying a fractional Fourier transform operation of power $-\epsilon$.

It is understood that in some types of situations, spatial scale factors of the image may need to be adjusted in conjunction with the fractional Fourier transform power. For small variations of the fractional Fourier transform power associated with a slight misfocus, this is unlikely to be necessary. However, should spatial scaling need to be made, various optical and signal processing methods well known to those skilled in the art can be incorporated. In the case of pixilated images (images generated by digital cameras, for example) or lined-images (generated by video-based systems, for example), numerical signal processing operations may require standard resampling (interpolation and/or decimation) as is well known to those familiar with standard signal processing techniques.

It is likely that the value of power $\epsilon$ is unknown a priori. In this particular circumstance, the power of the correcting fractional Fourier transform operation may be varied until the resulting image is optimally sharpened. This variation could be done by human interaction, as with conventional human interaction of lens focus adjustments on a camera or microscope, for example.

If desired, this variation could be automated using, for example, some sort of detector in an overall negative feedback situation. In particular, it is noted that a function with sharp edges are obtained only when its contributing, smoothly-shaped basis functions have very particular phase adjustments, and perturbations of these phase relationships rapidly smooth and disperse the sharpness of the edges. Most natural images contain some non-zero content of sharp edges, and further it would be quite unlikely that a naturally occurring, smooth gradient would tighten into a sharp edge under the action of the fractional Fourier transform because of the extraordinary basis phase relationships required. This suggests that a spatial high-pass filter, differentiator, or other edge detector could be used as part of the sensor makeup. In particular, an automatically adjusting system may be configured to adjust the fractional Fourier transform power to maximize the sharp edge content of the resulting correcting image. If desired, such a system may also be configured with human override capabilities to facilitate pathological image situations, for example.

FIG. 2 shows an automated approach for adjusting the fractional Fourier transform parameters of exponential power and scale factor to maximize the sharp edge content of the resulting correcting image. In this figure, original image data 201 is presented to an adjustable fractional Fourier transform element 202, which may be realized physically via optical processes or numerically (using an image processing or computation system, for example). The power and scale factors of the fractional Fourier transform may be set and adjusted 203 as necessary under the control of a step direction and size control element 204.

Typically, this element would initially set the power to the ideal value of zero (making the resulting image data 205 equivalent to the original image data 201) or two (making the resulting image data 205 equivalent to an inverted image of original image data 201), and then deviate slightly in either direction from this initial value. The resulting image data 205 may be presented to edge detector 206 which identifies edges, via differentiation or other means, whose sharpness passes a specified fixed or adaptive threshold. The identified edge information may be passed to an edge percentage tally element 207, which transforms this information into a scalar-valued measure of the relative degree of the amount of edges, using this as a measure of image sharpness.

The scalar measure value for each fractional Fourier transform power may be stored in memory 208, and presented to step direction and size control element 204. The step direction and size control element compares this value with the information stored in memory 208 and adjusts the choice of the next value of fractional Fourier transform power accordingly. In some implementations, the step direction and size control element may also control edge detection parameters, such as the sharpness threshold of edge detector element 207. When the optimal adjustment is determined, image data 205 associated with the optimal fractional Fourier transform power is designated as the corrected image.

It is understood that the above system amounts to a negative-feedback control or adaptive control system with a fixed or adaptive observer. As such, it is understood that alternate means of realizing this automated adjustment can be applied by those skilled in the art. It is also clear to one skilled in the art that various means of interactive human intervention may be introduced into this automatic system to handle problem cases or as a full replacement for the automated system.

In general, the corrective fractional Fourier transform operation can be accomplished by any one or combination of optical, numerical computer, or digital signal processing methods as known to those familiar with the art, recognizing yet other methods may also be possible. Optical methods may give effectively exact implementations of the fractional Fourier transforms, or in some instances, approximate implementations of the transforms.

For a pixilated image, numerical or other signal processing methods may give exact implementations through use of the discrete version of the fractional Fourier transform [10].

Additional computation methods that are possible include one or more of:
dropping the leading scalar complex-valued phase term (which typically has little or no effect on the image);
decomposing the fractional Fourier transform as a pre-multiplication by a "phase chirp" $e^{j\alpha x^2}$, taking a conventional Fourier transform with appropriately scaled variables, and multiplying the result by another "phase chirp;" and
changing coordinate systems to Wigner form:

$$\left\{ \frac{(x+y)}{w}, \frac{(x-y)}{w} \right\} \tag{13}$$

If desired, any of these just-described computation methods can be used with the approximating methods described below.

Other embodiments provide approximation methods for realizing the corrective fractional Fourier transform operation. For a non-pixilated image, numerical or other signal processing methods can give approximations through:
finite-order discrete approximations of the integral representation;
finite-term discrete approximations by means of the Hermite expansion representation; and
the discrete version of the fractional Fourier transform [10].

Classical approximation methods [11, 12] may be used in the latter two cases to accommodate particular engineering, quality, or cost considerations.

In the case of Hermite expansions, the number of included terms may be determined by analyzing the Hermite expansion of the image data, should this be tractable. In general, there will be some value in situations where the Hermite function expansion of the image looses amplitude as the order of the Hermite functions increases. Hermite function orders with zero or near-zero amplitudes may be neglected entirely from the fractional Fourier computation due to the eigenfunction role of the Hermite functions in the fractional Fourier transform operator.

One method for realizing finite-order discrete approximations of the integral representation would be to employ a localized perturbation or Taylor series expansion of the integral representation. In principal, this approach typically requires some mathematical care in order for the operator to act as a reflection operator (i.e., inversion of each horizontal direction and vertical direction as with the lens law) since the kernel behaves as a generalized function (delta function), and hence the integral representation of the fractional Fourier transform operator resembles a singular integral.

In a compound lens or other composite optical system, the reflection operator may be replaced with the identity operator, which also involves virtually identical delta functions and singular integrals as is known to those familiar in the art. However, this situation is fairly easy to handle as a first or second-order Taylor series expansion. The required first, second, and any higher-order derivatives of the fractional Fourier transform integral operator are readily and accurately obtained symbolically using available mathematical software programs, such as Mathematica or MathLab, with symbolic differential calculus capabilities. In most cases, the zero-order term in the expansion will be the simple reflection or identity operator. The resulting expansion may then be numerically approximated using conventional methods.

Another method for realizing finite-order discrete approximations of the integral representation would be to employ the infinitesimal generator of the fractional Fourier transform, that is, the derivative of the fractional Fourier transform with respect to the power of the transform. This is readily computed by differentiating the Hermite function expansion of the fractional Fourier transform, and use of the derivative rule for Hermite functions. Depending on the representation used [5, 14, 15], the infinitesimal generator may be formed as a linear combination of the Hamiltonian operator H and the identity operator I; for the form of the integral representation used earlier, this would be:

$$\frac{i\pi}{4}(H+I) \quad (14)$$

where and the identity operator I simply reproduces the original function, and $$H = \frac{\partial^2}{\partial x^2} - x^2 \quad (15)$$

The role of the infinitesimal generator, which can be denoted as A, is to represent an operator group in exponential form, a particular example is:

$$F^\alpha = e^{\alpha A} \quad (16)$$

For small values of A, one can then approximate $e^{\alpha A}$ as $I+(\alpha A)$, so using the fact [12] from before (repeated here):

$$(F^{2+\epsilon}[k(x)])^{-1} = F^{-2}F^{\mp\epsilon}[k(x)] = F^2F^{\mp\epsilon}[k(x)] = F^{\mp\epsilon}F^2[k(x)] = F^{\mp\epsilon}[k(-x)] \quad (17)$$

one can then approximate $F^\epsilon$ as $$F^\epsilon = I + (\epsilon A) = I + \epsilon\frac{i\pi}{4}\left(\frac{\partial^2}{\partial x^2} - x^2 + I\right) \quad (18)$$

These operations can be readily applied to images using conventional image processing methods. For non-pixilated images, the original source image can be approximated by two-dimensional sampling, and the resulting pixilated image can then be subjected to the discrete version of the fractional Fourier transform [10].

In cases where the discrete version of the fractional Fourier transform [10] is implemented, the transform may be approximated. Pairs of standard two-dimensional matrices, one for each dimension of the image, can be used. As with the continuous case, various types of analogous series approximations, such as those above, can be used.

Alternatively, it is noted that because of the commutative group property of the fractional Fourier transform, the matrix/tensor representations, or in some realizations even the integrals cited above may be approximated by pre-computing one or more fixed step sizes and applying these respectively, iteratively, or in mixed succession to the image data.

One exemplary embodiment utilizing a pre-computation technique may be where the fractional Fourier transform represents pre-computed, positive and negative values of a small power, for example 0.01. Negative power deviations of increasing power can be had by iteratively applying the pre-computed –0.01 power fractional Fourier transform; for example, the power –0.05 would be realized by applying the pre-computed –0.01 power fractional Fourier transform five times. In some cases of adaptive system realizations, it may be advantageous to discard some of the resulting image data from previous power calculations. This may be accomplished by backing up to a slightly less negative power by applying the +0.01 power fractional Fourier transform to a last stored, resulting image.

As a second example of this pre-computation method, pre-computed fractional Fourier transform powers obtained from values of the series $2^{1/N}$ and $2^{-1/N}$ may be stored or otherwise made available, for example:

$$\{F^{\pm 1/1024}, F^{\pm 1/512}, F^{\pm 1/256}, F^{\pm 1/128}, F^{\pm 1/64}, \ldots\} \quad (19)$$

Then, for example, the power 11/1024 can be realized by operating on the image data with $$F^{1/1024}F^{1/256}F^{1/128} \quad (20)$$

where the pre-computed operators used are determined by the binary-decomposition of the power with respect to the smallest power value (here, the smallest value is 1/1024 and the binary decomposition of 11/1024 is 1/1024+1/256+1/128, following from the fact that 11=8+2+1).

Such an approach allows, for example, N steps of resolution to be obtained from a maximum of $\log_2 N$ compositions of $\log_2 N$ pre-computed values. This approach may be used to calculate fractional powers of any linear matrix or tensor, not just the fractional Fourier transform.

It is noted that any of the aforementioned systems and methods may be adapted for use on portions of an image rather than the entire image. This permits corrections of localized optical aberrations. In complicated optical aberration situations, more than one portion of an image may be processed in this manner, with differing corrective operations made for each portion of the image.

It is further noted that the systems and methods described herein may also be applied to conventional lens-based optical image processing systems, to systems with other types of elements obeying fractional Fourier optical models, as well as to widely ranging environments such as integrated optics, optical computing systems, particle beam systems, electron microscopes, radiation accelerators, and astronomical observation methods, among others.

Commercial products and services application are widespread. For example, the present invention may be incorporated into film processing machines, desktop photo editing software, photo editing web sites, VCRs, camcorders, desktop video editing systems, video surveillance systems, video conferencing systems, as well as in other types of products and service facilities. Four exemplary consumer-based applications are now considered.

1. One particular consumer-based application is in the correction of camera misfocus in chemical or digital photography. Here the invention may be used to process the image optically or digitally, or some combination thereof, to correct the misfocus effect and create an improved image which is then used to produce a new chemical photograph or digital image data file. In this application area, the invention can be incorporated into film processing machines, desktop photo editing software, photo editing web sites, and the like.

2. Another possible consumer-based application is the correction of video camcorder misfocus. Camcorder misfocus typically results from user error, design defects such as a poorly designed zoom lens, or because an autofocus function is autoranging on the wrong part of the scene being recorded. Non-varying misfocus can be corrected for each image with the same correction parameters. In the case of zoom lens misfocus, each frame or portion of the video may require differing correction parameters. In this application area, the invention can be incorporated into VCRs, camcorders, video editing systems, video processing machines, desktop video editing software, and video editing web sites, among others.

3. Another commercial application involves the correction of image misfocus experienced in remote video cameras utilizing digital signal processing. Particular examples include video conference cameras or security cameras. In these scenarios, the video camera focus cannot be adequately or accessibly adjusted, and the video signal may in fact be compressed.

4. Video compression may involve motion compensation operations that were performed on the unfocused video image. Typical applications utilizing video compression include, for example, video conferencing, video mail, and web-based video-on-demand, to name a few. In these particular types of applications, the invention may be employed at the video receiver, or at some pre-processing stage prior to delivering the signal to the video receiver. If the video compression introduces a limited number of artifacts, misfocus correction is accomplished as presented herein. However, if the video compression introduces a higher number of artifacts, the signal processing involved with the invention may greatly benefit from working closely with the video decompression signal processing. One particular implementation is where misfocus corrections are first applied to a full video frame image. Then, for some interval of time, misfocus correction is only applied to the changing regions of the video image. A specific example may be where large portions of a misfocused background can be corrected once, and then reused in those same regions in subsequent video frames.

5. The misfocus correction techniques described herein are directly applicable to electron microscopy systems and applications. For example, electron microscope optics employ the wave properties of electrons to create a coherent optics environment that obeys the Fourier optics structures as coherent light (see, for example, John C. H. Spence, *High-Resolution Electron Microscopy*, third edition, 2003, Chapters 2–4, pp. 15–88). Electron beams found in electron microscopes have the same geometric, optical physics characteristics generally found in coherent light, and the same mathematical quadratic phase structure as indicated in Levi [1] Section 19.2 for coherent light, which is the basis of the fractional Fourier transform in optical systems (see, for example, John C. H. Spence *High-Resolution Electron Microscopy*, third edition, 2003, Chapter 3, formula 3.9, pg. 55).

Misfocused Optical Path Phase Reconstruction

Most photographic and electronic image capture, storage, and production technologies are only designed to operate with image amplitude information, regardless as to whether the phase of the light is phase coherent (as is the case with lasers) or phase noncoherent (as generally found in most light sources). In sharply focused images involving noncoherent light formed by classical geometric optics, this lack of phase information is essentially of no consequence in many applications.

In representing the spatial distribution of light, the phase coefficient of the basis functions can be important; as an example, FIG. 3.6, p. 62 of *Digital Image Processing—Concepts, Algorithms, and Scientific Applications*, by Bernd Jahne, Springer-Verlag, New York, 1991 [20] shows the effect of loss and modification of basis function phase information and the resulting distortion in the image. Note in this case the phase information of the light in the original or reproduced image differs from the phase information applied to basis functions used for representing the image.

In using fractional powers of the Fourier transform to represent optical operations, the fractional Fourier transform reorganizes the spatial distribution of an image and the phase information as well. Here the basis functions serve to represent the spatial distribution of light in a physical system and the phase of the complex coefficients multiplying each of the basis functions mathematically result from the fractional Fourier transform operation. In the calculation that leads to the fractional Fourier transform representation of a lens, complex-valued coefficients arise from the explicit accounting for phase shifts of light that occurs as it travels through the optical lens (see Goodman [2], pages 77–96, and Levi [1], pages 779–784).

Thus, when correcting misfocused images using fractional powers of the Fourier transform, the need may arise for the reconstruction of relative phase information that was lost by photographic and electronic image capture, storage, and production technologies that only capture and process image amplitude information.

In general, reconstruction of lost phase information has not previously been accomplished with much success, but some embodiments of the invention leverage specific properties of both the fractional Fourier transform and an ideal correction condition. More specifically, what is provided—for each given value of the focus correction parameter—is the calculation of an associated reconstruction of the relative phase information. Typically, the associated reconstruction will be inaccurate unless the given value of the focus correction parameter is one that will indeed correct the focus of the original misfocused image.

This particular aspect of the invention provides for the calculation of an associated reconstruction of relative phase information by using the algebraic group property of the fractional Fourier transform to back calculate the lost relative phase conditions that would have existed, if that given specific focus correction setting resulted in a correctly focused image. For convergence of human or machine iterations towards an optimal or near optimal focus correction, the system may also leverage the continuity of variation of the phase reconstruction as the focus correction parameter is varied in the iterations.

Figure 10:
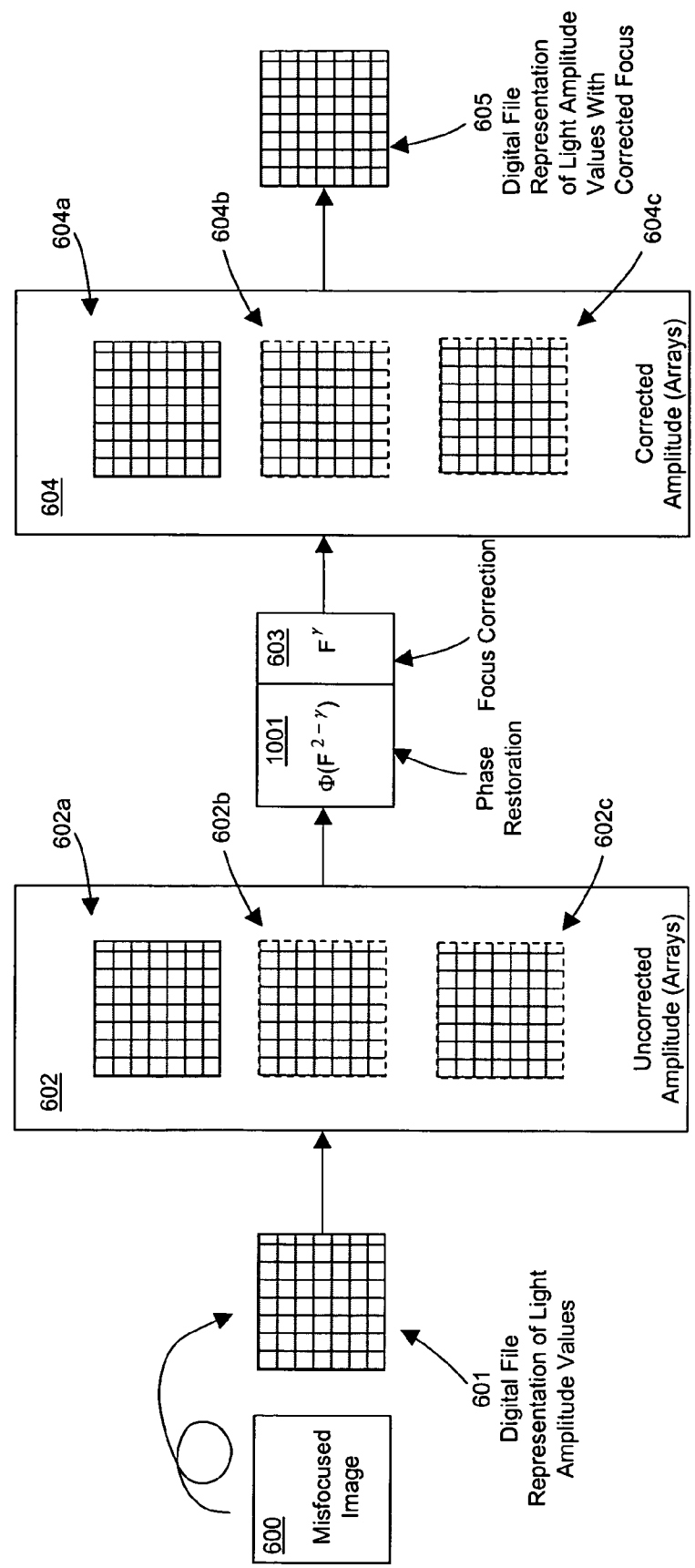
FIG. 10 is a block diagram showing an exemplary image misfocus correction process that also provides for phase correction, in accordance with an alternative embodiment of the invention.

To facilitate an understanding of the phase reconstruction aspect of the invention, it is helpful to briefly summarize the some of the image misfocus correction aspects of the invention. This summary will be made with reference to the various optical set-ups depicted in FIGS. 4–8, and is intended to provide observational details and examples of where and how the relative phase reconstruction may be calculated (FIG. 9) and applied (FIG. 10).

Misfocus Correction

Figure 4:
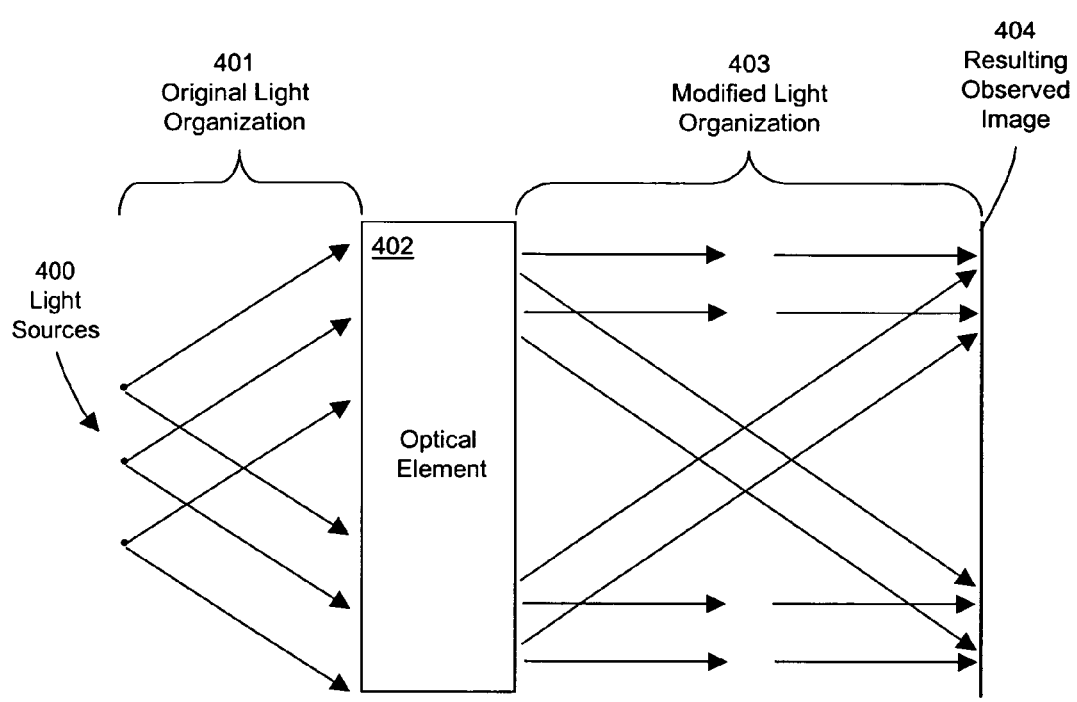
FIG. 4 is a diagram showing a generalized optical environment for implementing image correction in accordance with the present invention.

FIG. 4 shows a general optical environment involving sources of radiating light 400, a resulting original light organization (propagation direction, amplitude, and phase) 401 and its constituent photons. Optical element 402 is shown performing an image-forming optical operation, causing a modified light organization (propagation direction, amplitude, and phase) 403 and its constituent photons, ultimately resulting in observed image 404. This figure shows that for each light organization 401, 403 of light and photons, the propagation direction, amplitude, and phase may be determined by a variety of different factors. For example, for a given propagation media, propagation direction, amplitude, and phase may be determined by such things as the separation distance between point light source 400 and optical element 402, the pixel location in a transverse plane parallel to the direction of propagation, and light frequency/wavelength, among others.

Figure 5:
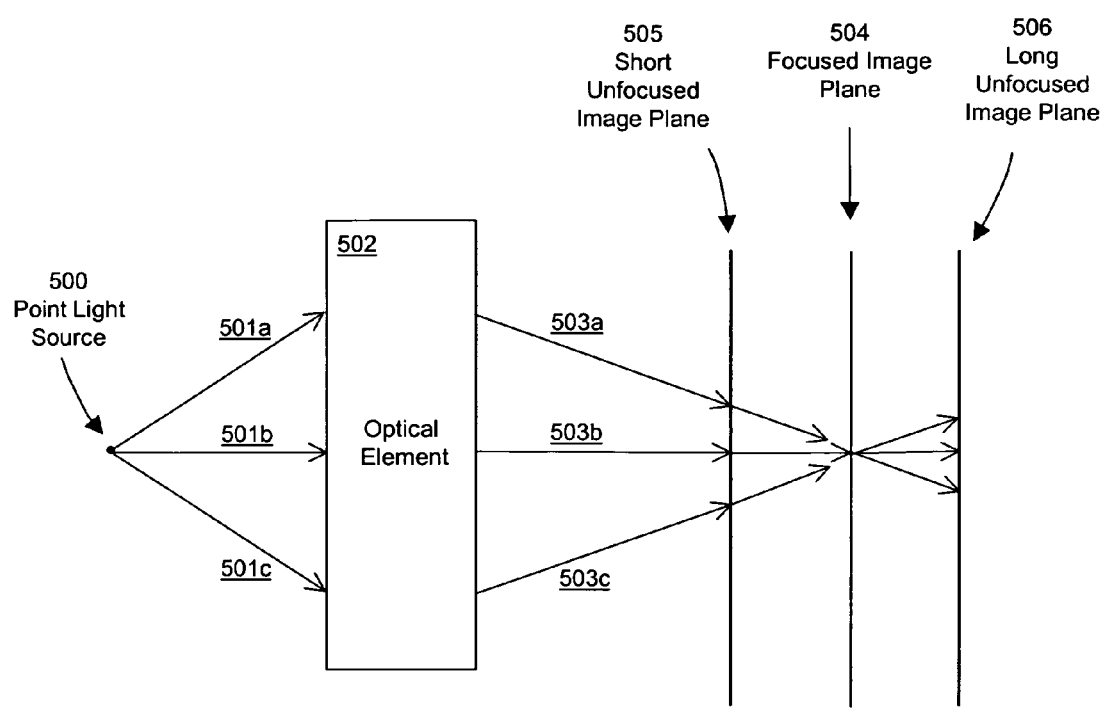
FIG. 5 is a diagram showing focused and unfocused image planes in relationship to the optical environment depicted in FIG. 4.

FIG. 5 is an optical environment similar to that depicted in FIG. 4, but the FIG. 5 environment includes only a single point light source 500. In this Figure, single point light source 500 includes exemplary propagation rays 501a, 501b, 501c that are presented to optical element 502. The optical element is shown imposing an optical operation on these rays, causing them to change direction 503a, 503b, 503c. Each of the rays 503a, 503b, 503c are shown spatially reconverging at a single point in the plane of image formation 504, which is a focused image plane.

FIG. 5 also shows directionally modified rays 503a, 503b, 503c spatially diverging at short unfocused image plane 505 and long unfocused image plane 506, which are each transverse to the direction of propagation that is associated with images which are not in sharp focus, which will be referred to as nonfocused image planes. Further description of the optical environment shown in FIG. 5 will be presented to expand on phase correction, and such description will be later discussed with regard to FIGS. 9–10.

Figure 6:
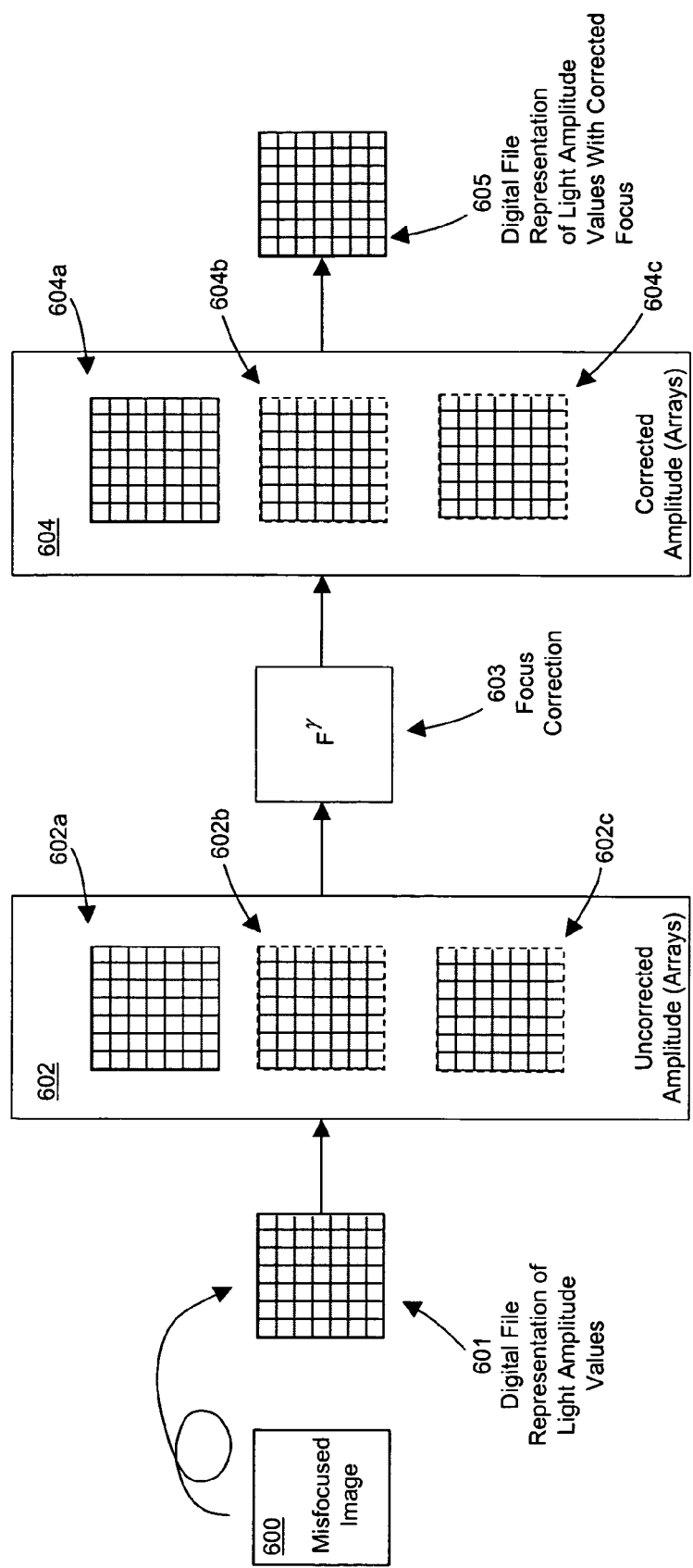
FIG. 6 is a block diagram showing an exemplary image misfocus correction process that also provides phase corrections.
Figure 7:
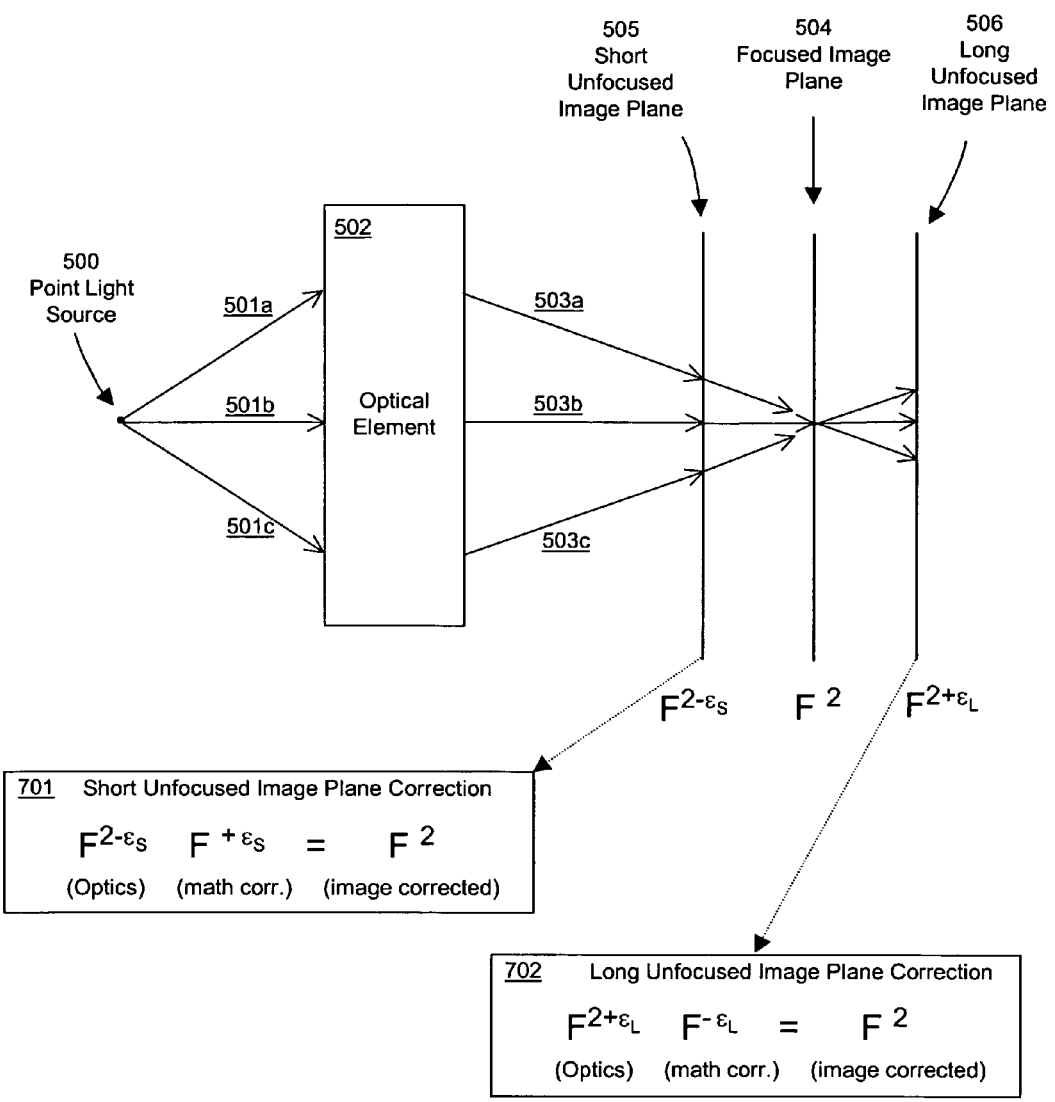
FIG. 7 is a diagram showing a more detailed view of the focused and unfocused image planes shown in FIG. 5.
Figure 8:
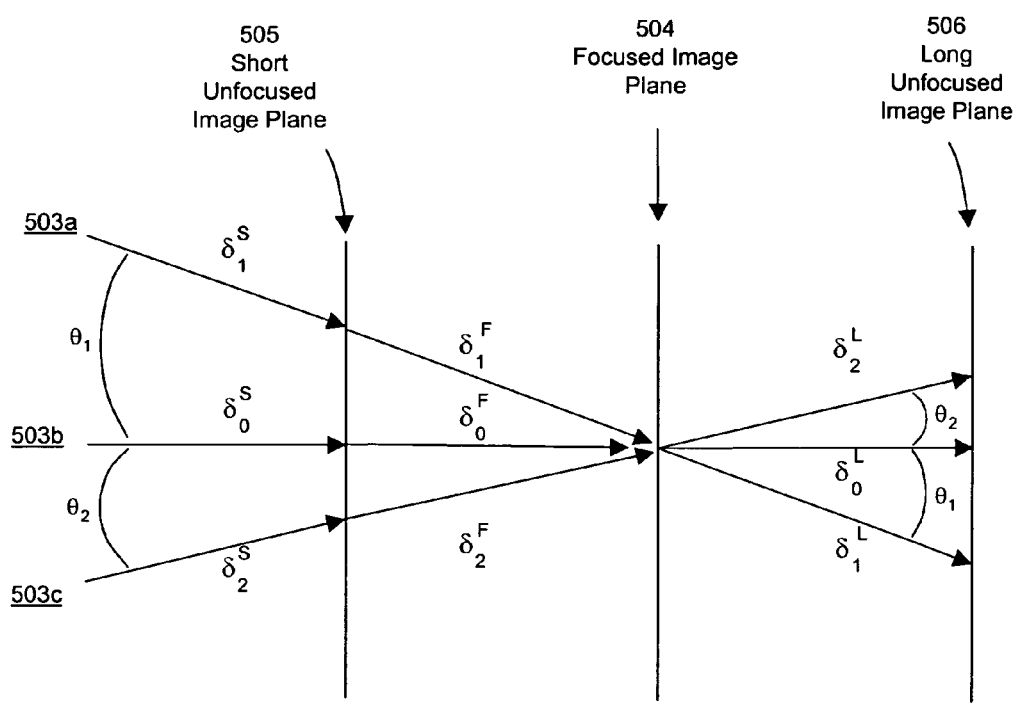
FIG. 8 is a diagram showing typical phase shifts involved in the focused and unfocused image planes depicted in FIG. 5.

Reference is now made to FIGS. 6–8, which disclose techniques for mathematical focus correction and provides a basis for understanding the phase correction aspect of the present invention. For clarity, the term "lens" will be used to refer to optical element 502, but the discussion applies equally to other types of optical elements such as a system of lenses, graded-index material, and the like.

FIG. 6 provides an example of image information flow in accordance with some embodiments of the present invention. As depicted in block 600, an original misfocused image is adapted or converted as may be necessary into a digital file representation of light amplitude values 601. Examples of original misfocused images include natural or photographic images. Digital file 601 may include compressed or uncompressed image formats.

For a monochrome image, the light amplitude values are typically represented as scalar quantities, while color images typically involve vector quantities such as RBG values, YUV values, and the like. In some instances, the digital file may have been subjected to file processes such as compression, decompression, color model transformations, or other data modification processes to be rendered in the form of an array of light amplitude values 602. Monochrome images typically only include a single array of scalar values 602a. In contrast, color images may require one, two, or more additional arrays, such as arrays 602b and 602c. A CMYB color model is a particular example of a multiple array, color image.

The array, or in some instances, arrays of light amplitude values 602 may then be operated on by a fractional power of the Fourier transform operation 603. This operation mathematically compensates for lens misfocus causing the focus problems in the original misfocused image 600. A result of this operation produces corrected array 604, and in case of a color model, exemplary subarrays 604a, 604b, 604c result from the separate application of the fractional power of the Fourier transform operation 603 to exemplary subarrays 602a, 602b, 602c. If desired, each of the corrected subarrays 604a, 604b, 604c may be converted into a digital file representation of the corrected image 605; this digital file could be the same format, similar format, or an entirely different format from that of uncorrected, original digital file representation 601.

FIG. 7 shows an optical environment having nonfocused planes. This figure shows that the power of the fractional Fourier transform operator increases as the separation distance between optical lens operation 502 and image planes 504, 505 increases, up to a distance matching that of the lens law. In accordance with some aspects of the invention, and as explained in Ludwig [5], Goodman [2], pages 77–96, and Levi [1], pages 779–784, an exactly focused image corresponds to a fractional Fourier transform power of exactly two. Furthermore, as previously described, misfocused image plane 505 lies short of the focused image plane 504, and corresponds to a fractional Fourier transform operation with a power slightly less than two. The deviation in the power of the fractional Fourier transform operation corresponding to short misfocus image plane 505 will be denoted $(-\epsilon_S)$, where the subscript "S" denotes "short." Since an exactly focused image at focused image plane 504 corresponds to a fractional Fourier transform power of exactly two, this short misfocus may be corrected by application of the fractional Fourier transform raised to the power $(+\epsilon_S)$, as indicated in block 701.

By mathematical extension, as described in [5], a long misfocused image plane 506 that lies at a distance further away from optical element 502 than does the focused image plane 504 would correspond to a fractional Fourier transform operation with a power slightly greater than two. The deviation in the power of the fractional Fourier transform operation corresponding to long misfocus image plane 506 will be denoted $(+\epsilon_L)$, where the subscript "L" denotes "long." This long misfocus may be corrected by application of the fractional Fourier transform raised to the power $(-\epsilon_L)$, as indicated in block 702.

Relative Phase Information in the Misfocused Optical Path

In terms of geometric optics, misfocus present in short misfocused image plane 505 and long misfocused image plane 506 generally correspond to non-convergence of rays traced from point light source 500, through optical element 502, resulting in misfocused images planes 505 and 506. For example, FIGS. 5 and 7 show exemplary rays 501a, 501b, 501c diverging from point light source 500, passing through optical element 502, and emerging as redirected rays 503a, 503b, 503c. The redirected rays are shown converging at a common point in focused image plane 504. However, it is important to note that these redirected rays converge at discreetly different points on misfocused image planes 505 and 506.

FIG. 8 is a more detailed view of image planes 504, 505 and 506. In this figure, rays 503a, 503b, 503c are shown relative to focused image plane 504, and misfocused image planes 505 and 506. This figure further shows the path length differences that lead to phase shifts of the focused and unfocused planes result from varying angles of incidence, denoted by $\theta_1$ and $\theta_2$. The distances of rays 503a, 503b, 503c from optical element 502 are given by the following table:

TABLE 1

| Ray | Distance to incidence with short misfocused plane 505 | Distance to incidence with focus plane 504 | Distance to incidence with long misfocused plane 506 |
|---|---|---|---|
| 503a | $\delta_1^S$ | $\delta_1^F$ | $\delta_1^L$ |
| 503b | $\delta_0^S$ | $\delta_0^F$ | $\delta_0^L$ |
| 503c | $\delta_2^S$ | $\delta_2^F$ | $\delta_2^L$ |

Simple geometry yields the following inequality relationships:

$$\delta_0^S < \delta_0^F < \delta_0^L \quad (21)$$

$$\delta_1^S < \delta_1^F < \delta_1^L \quad (22)$$

$$\delta_2^S < \delta_2^F < \delta_2^L \quad (23)$$

For a given wavelength $\lambda$, the phase shift $\psi$ created by a distance-of-travel variation $\delta$ is given by the following:

$$\psi = 2\pi\delta/\lambda \quad (24)$$

so the variation in separation distance between the focus image plane 504 and the misfocus image planes 505, 506 is seen to introduce phase shifts along each ray.

Further, for $\pi/2 > \theta_1 > \theta_2 > 0$, as is the case shown in FIG. 8, simple trigonometry gives:

$$\delta_0^F = \delta_1^F \sin\theta_1 \quad (25)$$

$$\delta_0^F = \delta_2^F \sin\theta_2 \quad (26)$$

$$1 > \sin\theta_1 > \sin\theta_2 > 0 \quad (27)$$

which in turn yields the inequality relationships:

$$\delta_0^S < \delta_2^S < \delta_1^S \quad (28)$$

$$\delta_0^F < \delta_2^F < \delta_1^F \quad (29)$$

$$\delta_0^L < \delta_2^L < \delta_1^L \quad (30)$$

Again, for a given wavelength $\lambda$, the phase shift $\psi$ created by a distance-of-travel variation $\delta$ is given by the following:

$$\psi = 2\pi\delta/\lambda \quad (31)$$

so the variation in separation distance between focused image plane 504 and the misfocused image planes 505, 506 is seen to introduce non-uniform phase shifts along each ray. Thus the misfocus of the original optical path involved in creating the original image (for example, 600 in FIG. 6) introduces a non-uniform phase shift across the rays of various incident angles, and this phase shift varies with the distance of separation between the positions of misfocused image planes 505, 506, and the focused image plane 504.

Referring again to FIGS. 6 and 7, an example of how a misfocused image 600 may be corrected will now be described. A misfocused image requiring correction will originate either from short misfocused plane 505 or long misfocused plane 506. In situations where misfocused image 600 originates from short misfocused plane 505, misfocus correction may be obtained by applying a fractional Fourier transform operation raised to the power $(+\epsilon_S)$, as indicated in block 701. On the other hand, in situations where misfocused image 600 originates from long misfocused plane 506, misfocus correction may be obtained by applying a fractional Fourier transform operation raised to the power $(-\epsilon_L)$, as indicated in block 702.

In general, the fractional Fourier transform operation creates results that are complex-valued. In the case of the discrete fractional Fourier transform operation, as used herein, this operation may be implemented as, or is equivalent to, a generalized, complex-valued array multiplication on the array image of light amplitudes (e.g., $\phi$). In the signal domain, complex-valued multiplication of a light amplitude array element, $v_{ij}$, by a complex-valued operator element $\phi$, results in an amplitude scaling corresponding to the polar or phasor amplitude of $\phi$, and a phase shift corresponding to the polar or phasor phase of $\phi$.

FIG. 9 shows a series of formulas that may be used in accordance with the present invention. As indicated in block 901, the fractional Fourier transform operation array (FrFT) is symbolically represented as the product of an amplitude information array component and a phase information array component. The remaining portions of FIG. 9 illustrate one technique for computing phase correction in conjunction with the correction of image misfocus.

For example, block 902 shows one approach for correcting image misfocus, but this particular technique does not provide for phase correction. Image correction may proceed by first noting that the misfocused optics corresponds to a fractional Fourier transform of power 2-$\epsilon$ for some unknown value of $\epsilon$; here $\epsilon$ may be positive (short-misfocus) or negative (long-misfocus). Next, the fractional Fourier transform may be mathematically applied with various, systematically selected trial powers until a suitable trial power is found. A particular example may be where the trial power is effectively equal to the unknown value of $\epsilon$. The resulting mathematically corrected image appears in focus and a corrected image is thus produced.

Referring still to FIG. 9, block 903 depicts the misfocus correction technique of block 901, as applied to the approach shown in block 902. This particular technique accounts for the amplitude and phase components of the optical and mathematical fractional Fourier transform operations. In particular, there is an amplitude and phase for the misfocused optics, which led to the original misfocused image 600.

As previously noted, conventional photographic and electronic image capture, storage, and production technologies typically only process or use image amplitude information, and were phase information is not required or desired. In these types of systems, the relative phase information created within the original misfocused optical path is lost since amplitude information is the only image information that is conveyed. This particular scenario is depicted in block 904, which shows original misfocused image 600 undergoing misfocus correction, even thought its relative phase information is not available. In all applicable cases relevant to the present invention (for example, $0 < \epsilon < 2$), the phase information is not uniformly zero phase, and thus the missing phase information gives an inaccurate result (that is, not equal to the focused case of the Fourier transform raised to the power 2) for what should have been the effective correction.

Relative Phase Restoration

In accordance with some embodiments, missing phase information may be reintroduced by absorbing it within the math correction stage, as shown block 905. This absorbing technique results in a phase-restored math correction of the form:

$$\Phi(F^{2-\gamma})F^{\gamma} \quad (32)$$

where the following symbolic notation is used:

$$\Phi(X) = \text{phase}(X) \quad (33)$$

In the case where $\gamma$ is close enough to be effectively equal to $\epsilon$, the phase correction will effectively be equal to the value necessary to restore the lost relative phase information. Note that this expression depends only on $\gamma$, and thus phase correction may be obtained by systematically iterating $\gamma$ towards the unknown value of $\epsilon$, which is associated with the misfocused image. Thus the iteration, computation, manual adjustment, and automatic optimization systems, methods, and strategies of non-phase applications of image misfocus correction may be applied in essentially the same fashion as the phase correcting applications of image misfocus correction by simply substituting $F^\gamma$ with $\Phi(F^{2-\gamma})F^\gamma$ in iterations or manual adjustments.

FIG. 10 provides an example of image information flow in accordance with some embodiments of the invention. This embodiment is similar to FIG. 6 is many respects, but the technique shown in FIG. 10 further includes phase restoration component 1001 coupled with focus correction component 603. In operation, image array 602 is passed to phase restoration component 1001, which pre-operates on image array 602. After the pre-operation calculation has been performed, fractional Fourier transform operation 603 is applied to the image array.

Numerical Calculation of Relative Phase Restoration

Next, the calculation of the phase-restored mathematical correction is considered. Leveraging two-group antislavery properties of the fractional Fourier transform operation, the additional computation can be made relatively small.

In the original eigenfunction/eigenvector series definitions for both the continuous and discrete forms of the fractional Fourier transform of power $\alpha$, the nth eigenfunction/eigenvectors are multiplied by:

$$e^{-in\pi\alpha/2} \quad (34)$$

Using this equation and replacing $\alpha$ with $(2-\gamma)$ gives:

$$e^{-in\pi(2-\gamma)/2} = e^{-in\pi} e^{in\pi(-\gamma)/2} \quad (35)$$
$$= (-1)^n e^{in\pi(-\gamma)/2}$$

for both the continuous and discrete forms of the fractional Fourier transform. Note that the following equation:

$$e^{-in\pi(-\gamma)} \quad (36)$$

can be rewritten as:

$$e^{-in\pi(-\gamma)} = e^{in\pi\gamma} = (e^{-in\pi\gamma})^* \quad (37)$$

where $(X)^*$ denotes the complex conjugate of X.

Also, because the nth Hermite function $h_n(y)$ is odd in y for odd n, and even in y for even n, such that:

$$h_n(-y) = (-1)^n h_n(-y) \quad (38)$$

so that in the series definition the nth term behaves as:

$$h_n(x)h_n(y)e^{-in\pi(2-\gamma)/2} = h_n(x)h_n(y)(-1)^n e^{-in\pi(-\gamma)/2} \quad (39)$$
$$= h_n(x)h_n(-y)e^{-in\pi(-\gamma)/2}$$
$$= h_n(x)h_n(-y)(e^{-in\pi\gamma})^*$$

For both the continuous and discrete forms of the fractional Fourier transform, replacing $h_n(y)$ with $h_n(-y)$ is equivalent to reversing, or taking the mirror image, of $h_n(y)$. In particular, for the discrete form of the fractional Fourier transform, this amounts to reversing the order of terms in the eigenvectors coming out of the similarity transformation, and because of the even-symmetry/odd-antisymmetry of the Hermite functions and the fractional Fourier transform discrete eigenvectors, this need only be done for the odd number eigenvectors.

Further, since the Hermite functions and discrete Fourier transform eigenvectors are real-valued, the complex conjugate can be taken on the entire term, not just the exponential, as shown by:

$$h_n(x)h_n(-y)(e^{-in\pi\gamma})^* = [h_n(x)h_n(-y)e^{-in\pi\gamma}]^* \quad (40)$$

Since complex conjugation commutes with addition, all these series terms can be calculated and summed completely before complex conjugation, and then one complex conjugation can be applied to the sum, resulting in the same outcome.

The relative phase-restored mathematical correction can thus be calculated directly, for example, by the following exemplary algorithm or its mathematical or logistic equivalents:

1. For a given value of $\gamma$, compute $F^\gamma$ using the Fourier transform eigenvectors in an ordered similarity transformation matrix;
2. For the odd-indexed eigenvectors, either reverse the order or the sign of its terms to get a modified similarity transformation;
3. Compute the complete resulting matrix calculations as would be done to obtain a fractional Fourier transform, but using this modified similarity transformation;
4. Calculate the complex conjugate of the result of operation (3) to get the phase restoration, $(\Phi(F^\gamma))^*$; and
5. Calculate the array product of the operation (1) and operation (4) to form the phase-restored focus correction $(\Phi(F^\gamma))^* F^\gamma$.

As an example of a mathematical or logistic equivalent to the just described series of operations, note the commonality of the calculations in operations (1) and (3), differing only in how the odd-indexed eigenvectors are handled in the calculation, and in one version, only by a sign change. An example of a mathematical or logistic equivalent to the above exemplary technique would be:

1. For a given value of $\gamma$, partially compute $F^\gamma$ using only the even-indexed Fourier transform eigenvectors;
2. Next, partially compute the remainder of $F^\gamma$ using only the odd-indexed Fourier transform eigenvectors;
3. Add the results of operation (1) and (2) to get $F^\gamma$
4. Subtract the result of operation (2) from the result of operation (1) to obtain a portion of the phase restoration;
5. Calculate the complex conjugate of the result of operation (4) to obtain the phase restoration $(\Phi(F^\gamma))^*$; and
6. Calculate the array product of operations (1) and (4) to form $(\Phi(F^\gamma))^* F^\gamma$.

In many situations, partially computing two parts of one similarity transformation, as described in the second exemplary algorithm, could be far more efficient than performing two full similarity transformation calculations, as described in the first exemplary algorithm. One skilled in the art will recognize many possible variations with differing advantages, and that these advantages may also vary with differing computational architectures and processor languages.

Embedding Phase Restoration within Image Misfocus Correction

Where relative phase-restoration is required or desired in mathematical focus correction using the fractional Fourier transform, phase restoration element 1001 may be used in combination with focus correction element 603, as depicted in FIG. 10.

It is to be realized that in image misfocus correction applications which do not account for phase restoration, pre-computed values of $F^\gamma$ may be stored, fetched, and multiplied as needed or desired. Similarly, in image misfocus correction applications which provide for phase restoration, pre-computed values of $\Phi(F^\gamma))*F^\gamma$ may also be stored, fetched, and multiplied as needed or desired. For example, pre-computed values of phase reconstructions may be stored corresponding to powers of the fractional Fourier transform, such that the powers are related by roots of the number 2, or realized in correspondence to binary representations of fractions, or both. In these compositions, care may need to be taken since the array multiplications may not freely commute due to the nonlinear phase extraction steps.

Each of the various techniques for computing the phase-restored focus correction may include differing methods for implementing pre-computed phase-restorations. For example, in comparing the first and second exemplary algorithms, predominated values may be made and stored for any of:

First example algorithm operation (5) or its equivalent second example algorithm operation (6);
First example algorithm operation (4) or its equivalent second example algorithm operation (5); and
Second example algorithm operations (1) and (2) with additional completing computations provided as needed.

Again, it is noted that these phase restoration techniques can apply to any situation involving fractional Fourier transform optics, including electron microscopy processes and the global or localized correction of misfocus from electron microscopy images lacking phase information. Localized phase-restored misfocus correction using the techniques disclosed herein may be particularly useful in three-dimensional, electron microscopy and tomography where a wide field is involved in at least one dimension of imaging.

It is also noted that the various techniques disclosed herein may be adapted for use on portions of an image rather than the entire image. This permits corrections of localized optical aberrations. In complicated optical aberration situations, more than one portion may be processed in this manner, in general with differing corrective operations made for each portion of the image.

Iterative Fractional Fourier Transform Computation Environments Leveraging the Structure of the Similarity Transformation It is also possible to structure computations of the fractional Fourier transform operating on a sample image array or sampled function vector so that portions of the computation may be reused in subsequent computations. This is demonstrated in the case of a similarity transformation representation of the fractional Fourier transform in FIG. 11. The general approach applies to vectors, matrices, and tensors of various dimensions, other types of multiplicative decompositional representations of the fractional Fourier transform, and other types of operators. In particular the approach illustrated in FIG. 11 may be directly applied to any diagonalizable linear matrix or tensor, not just the fractional Fourier transform.

Figure 11:
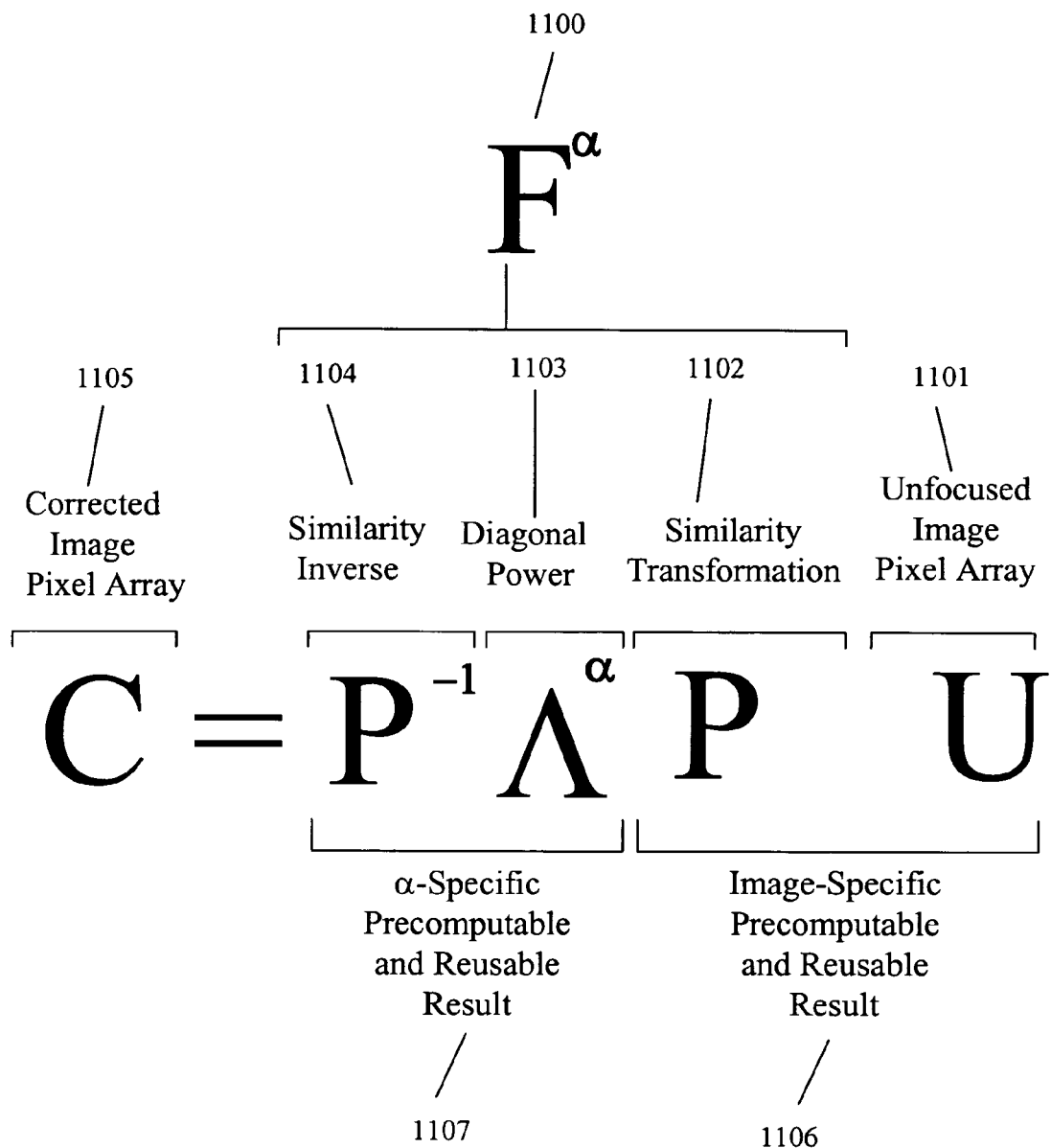
FIG. 11 shows a diagonalizable matrix, tensor, or linear operator acting on an underlying vector, matrix, tensor, or function.

FIG. 11 illustrates the action of a diagonalizable matrix, tensor, or linear operator on an underlying vector, matrix, tensor, or function 1101 to produce a resulting vector, matrix, tensor, or function 1105. In this approach, the chosen diagonalizable matrix, tensor, or linear operator 1100 is decomposed in the standard way into a diagonalized representation involving the ordered eigenvectors, eigenfunctions, etc. arranged to form a similarity transformation 1102, a diagonal matrix, tensor, or linear operator of eigenvalues 1103 with eigenvalues arranged in an ordering corresponding to the ordering of the similarity transformation 1102, and the inverse similarity transformation 1104 (equivalent to the inverse of similarity transformation 1102, i.e., the product of the inverse similarity transformation 1104 and similarity transformation 1102 is the identity). As described earlier, arbitrary powers of the chosen diagonalizable matrix, tensor, or linear operator 1100 may be obtained by taking powers of the diagonal matrix, tensor, or linear operator of eigenvalues 1103, which amounts to simply raising each eigenvalue to the desired power.

In particular, to obtain the $\alpha$ power of the chosen diagonalizable matrix, tensor, or linear operator 1100, one simply raises each eigenvalue in the diagonal matrix, tensor, or linear operator of eigenvalues 1103 to the $\alpha$ power. This is noted as $\Lambda^\alpha$ in FIGS. 4 and 5. Although the discussion thus far is for a very general case, the underlying vector, matrix, tensor, or function 1101 for the focus correction task will be the unfocused image pixel array U, the resulting vector, matrix, tensor, or function 1102 will be the trial "corrected" image pixel array C 1105, the similarity transformation 1102 will be an ordered collection of eigenvectors of the discrete Fourier transform of two dimensions (a 4-tensor, but simply the outer product of two 2-dimensional matrices, each diagonalized in the standard fashion), and the diagonal matrix, tensor, or linear operator of eigenvalues 1103 raised to the power $\alpha$ amounts to the outer product of two 2-dimensional matrices, each with eigenvalues of the discrete Fourier transform arranged in corresponding order to that of P, the similarity transformation 1102.

It is possible to reuse parts of calculations made utilizing this structure in various application settings. In a first exemplary application setting, the image is constant throughout but the power $\alpha$ takes on various values, as in an iteration over values of $\alpha$ in an optimization loop or in response to a user-adjusted focus control. In this first exemplary application setting, the product 1106 of the similarity transformation P 1102 and the unfocused image data U 1101 can be executed once to form a precomputable and reusable result. Then any number of $\alpha$-specific values of the product of the inverse similarity transformation $P^{-1}$ 1104 and the diagonal power $\Lambda^\alpha$ 1103 can be computed separately to form various values of the $\alpha$-specific portion 1107, and each may be multiplied with the precalculated reusable result 1106. Further, since diagonal power $\Lambda^\alpha$ 1103 is indeed diagonal, multiplication of it by inverse similarity transformation $P^{-1}$ 1104 amounts to a "column" multiplication of a given column of inverse similarity transformation $P^{-1}$ 1104 by the eigenvalue in the corresponding "column" of the diagonal power $\Lambda^\alpha$ 1103. This considerably simplifies the required computations in a computational environment iterating over values of $\alpha$.

Figure 12:
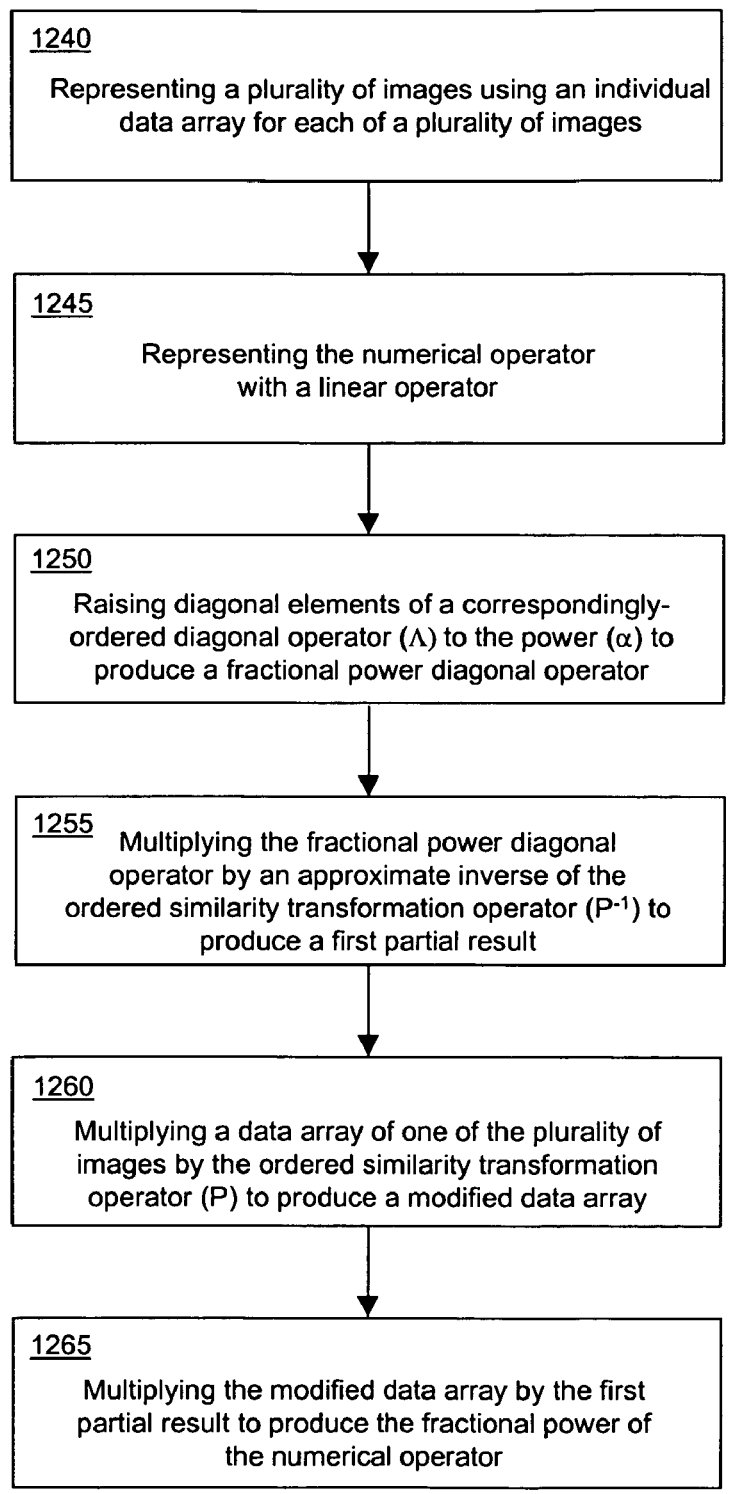
FIG. 12 is a flowchart showing exemplary operations for approximating the evolution of images propagating through a physical medium, in accordance with embodiments of the invention.

FIG. 12 is a flowchart showing exemplary operations for approximating the evolution of images propagating through a physical medium, in accordance with embodiments of the invention. This approximation may be achieved by calculating a fractional power of a numerical operator, which is defined by the physical medium and includes a diagonalizable numerical linear operator raised to a power ($\alpha$). In block 1240, a plurality of images are represented using an individual data array for each of the plurality of images. Block 1245 indicates that the numerical operator is represented with a linear operator formed by multiplying an ordered similarity transformation operator (P) by a correspondingly-ordered diagonal operator (Λ). The result of this is multiplied by an approximate inverse ($P^{-1}$) of the ordered similarity transformation operator (P).

Next, in block 1250, the diagonal elements of the correspondingly-ordered diagonal operator (Λ) are raised to the power (α) to produce a fractional power diagonal operator. Block 1255 includes multiplying the fractional power diagonal operator by an approximate inverse of the ordered similarity transformation operator ($P^{-1}$) to produce a first partial result. Block 1260 includes multiplying a data array of one of the plurality of images by the ordered similarity transformation operator (P) to produce a modified data array. Then, block 1265 includes multiplying the modified data array by the first partial result to produce the fractional power of the numerical operator. If desired, the operations depicted in block 1260 and 1265 may be repeated for each of the plurality of images.

A second exemplary application is one in which parts of previous calculations made using the structure of FIG. 11 are reused. In this embodiment, the power α is constant throughout but the image U 1101 is changed. This embodiment would pertain to a fixed correction that may be repeatedly applied to a number of image files, for example. This embodiment may be used to correct a systemic misfocus episode involving a number of image files U 1101, or implemented in situations in which a particular value of the power α is to be applied to a plurality of regions of a larger image. In this situation, the α-specific portion 1107 of the calculation can be executed once to form a precomputable and reusable result. Then any number of image specific calculations 1106 may be made and multiplied with this α-specific precomputable and reusable result 1107. Again, since diagonal power $\Lambda^\alpha$ 1103 is indeed diagonal, multiplication of it by inverse similarity transformation $P^{-1}$ 1104 amounts to a "column" multiplication of a given column of inverse similarity transformation $P^{-1}$ 1104 by the eigenvalue in the corresponding "column" of the diagonal power $\Lambda^\alpha$ 1103, considerably simplifying the required computations in a computational environment iterating over a plurality of image files, for example.

Figure 13:
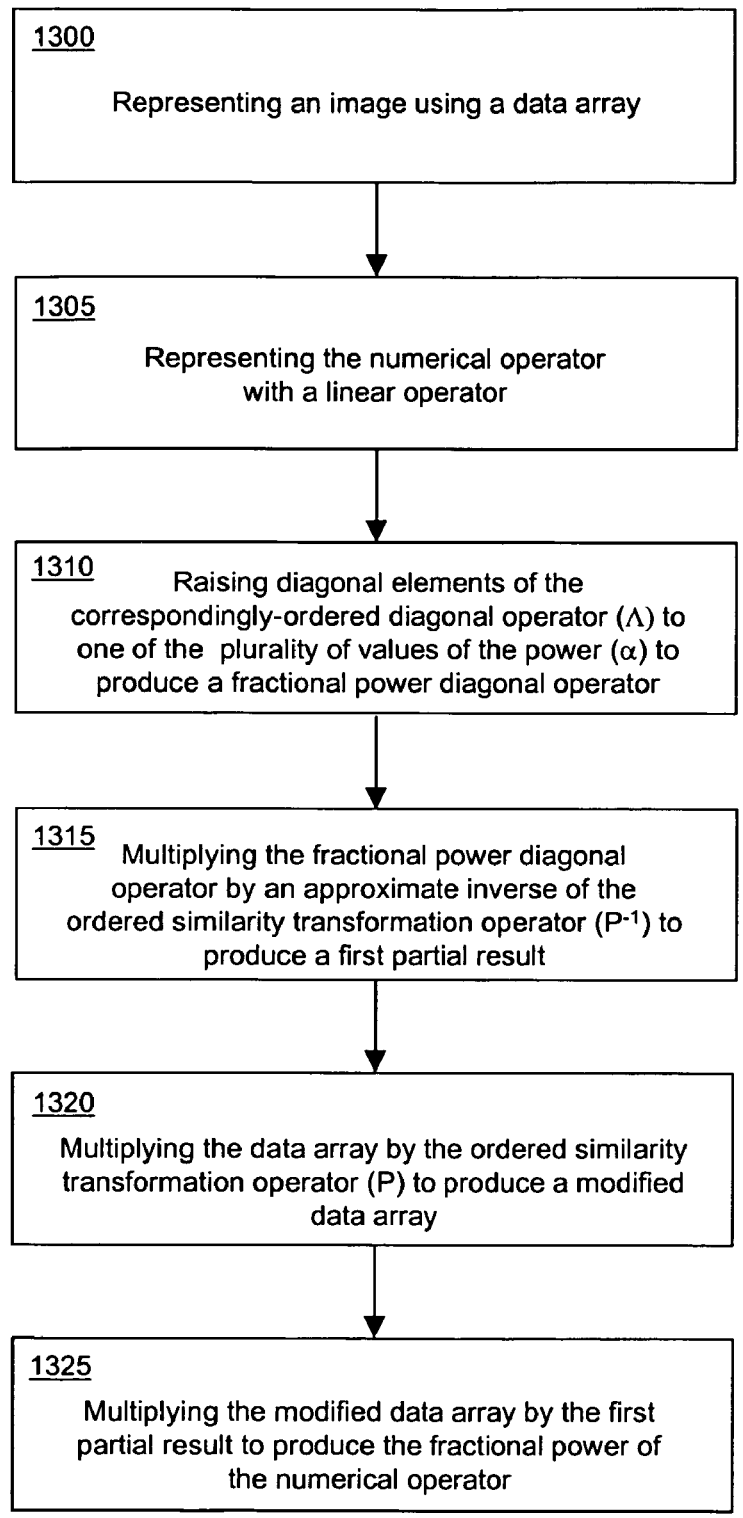
FIG. 13 is a flowchart showing exemplary operations for approximating the evolution of images propagating through a physical medium, in accordance with alternative embodiments of the invention.

FIG. 13 is a flowchart showing exemplary operations for approximating the evolution of images propagating through a physical medium, in accordance with alternative embodiments of the invention. This approximation may be achieved by calculating a fractional power of a numerical operator, which is defined by the physical medium and includes a diagonalizable numerical linear operator raised to a power (α) having any one of a plurality of values.

In block 1300, an image may be represented using a data array. Block 1305 indicates that the numerical operator is represented with a linear operator formed by multiplying an ordered similarity transformation operator (P) by a correspondingly-ordered diagonal operator (Λ). The result of this is multiplied by an approximate inverse ($P^{-1}$) of the ordered similarity transformation operator (P).

Next, in block 1310, the diagonal elements of the correspondingly-ordered diagonal operator (Λ) are raised to one of the plurality of values of the power (α) to produce a fractional power diagonal operator. Block 1315 includes multiplying the fractional power diagonal operator by an approximate inverse of the ordered similarity transformation operator ($P^{-1}$) to produce a first partial result. Block 1320 includes multiplying the data array of the image by the ordered similarity transformation operator (P) to produce a modified data array. Then, block 1325 includes multiplying the modified data array by the first partial result to produce the fractional power of the numerical operator. If desired, the operations depicted in blocks 1310 and 1315 may be repeated for each of the plurality of values of the power (α).

FIG. 14 comparatively summarizes the general calculations of each of the two described exemplary embodiments in terms of the structure and elements of FIG. 11. Image-specific calculations involving matrix or tensor multiplications can be carried out in an isolated step 1114, as can α-specific calculations in a separate isolated step 1110. Since diagonal power $\Lambda^\alpha$ 1103 is diagonal, multiplication of it by inverse similarity transformation $P^{-1}$ 1104 amounts to a "column" multiplication of a given column of inverse similarity transformation $P^{-1}$ 1104 by the eigenvalue in the corresponding "column" of the diagonal power $\Lambda^\alpha$ 1103, considerably simplifying the required computations for the α-specific calculation step 1110. Depending on the situation, either step 1114, 1110 may be made once and reused in calculations 1112 involving the matrix or tensor multiplication of the result of shared pre-computed results (i.e., one of 1114, 1110) and iteration-specific results (i.e., the other of 1114, 1110).

Matching the Centerings of the Numerical Transform and the Modeled Lens Action

The discrete fractional Fourier transform is often described as being based on the conventional definition of the classical discrete Fourier transform matrix. Because the classical discrete Fourier transform matrix has elements with harmonically-related periodic behavior, there is a shift invariance as to how the transform is positioned with respect to the frequency-indexed sample space and the time-indexed sample space. The classical discrete Fourier transform matrix typically starts with its first-row, first-column element as a constant, i.e., zero frequency (or in some applications, the lowest-frequency sample point), largely as a matter of convenience since the family of periodic behaviors of the elements and time/frequency sample spaces (i.e., periodic in time via application assumption, period in frequency via aliasing phenomena) are shift invariant.

The periodicity structure of underlying discrete Fourier transform basis functions (complex exponentials, or equivalently, sine and cosine functions) facilitate this elegant shift invariance in the matter of arbitrary positioning of the indices defining the classical discrete Fourier transform matrix. Thus the discrete classical Fourier transform is defined with its native-zero and frequency-zero at the far edge of the native-index range and frequency-index range. An example of this is the matrix depicted in FIG. 15. In this figure, the left-most column and top-most row, both having all entries with a value of 1, denote the native-zero and frequency-zero assignments to the far edge of the native-index range and frequency-index range (noting $e^{(j)(0)} = e^{(0)(k)} = e^0 = 1$).

However, the continuous fractional Fourier transform operates using an entirely different basis function alignment. The continuous fractional Fourier transform is defined with its native-zero and frequency-zero at the center of the native-variable range and frequency-variable range. This is inherited from the corresponding native-zero and frequency-zero centering of the continuous classical Fourier transform in the fractionalization process. This situation differs profoundly from the discrete classical Fourier transform and a discrete fractional Fourier transform defined from it (which, as described above, is defined with its native-zero and frequency-zero at the far edge of the native-index range and frequency-index range).

In particular, with respect to performing image propagation modeling with a fractionalization of a classical discrete Fourier transform, it is further noted that the native-zero and frequency-zero centering that corresponds to the continuous fractional Fourier transform naturally matches the modeling of the optics of lenses or other quadratic phase medium. In these optical systems, the phase of the light or particle beam varies as a function of the distance from the center of the lens. This aspect is illustrated in FIGS. 16A through 16C.

Turning now to FIGS. 16A through 16C, light or high-energy particles are shown radiating spherically from a point in source plane 1600, travelling through space or other medium to a thin lens 1601 where their direction is changed and redirected to a point in an image plane positioned according to the lens law for a focused image. Because image plane 1602 is thus positioned, all light or high-energy particle paths from the same source point that are captured by lens 1601 are bent in such a way that they all converge at the same point in the positioned image plane 1602. With respect to center line 1603, which is common to the center of the lens 1601, the point of convergence is located antipodally (modulo magnification factor), with respect the center line, from the location of the emitting point in source plane 1600.

FIG. 16A is a side view of source point 1610, which radiates in exemplary diverging paths 1611a, 1612a which are then bent by lens 1601 into converging paths 1611b and 1612b. Converging paths 1611b and 1612b are shown reconverging at point 1615 in image plane 1602. Modulo any magnification factor induced by the lens law action, convergence point 1615 is at a location opposite (antipodal), with respect to center line 1603, to the position of source point 1610.

FIG. 16b is a side view of second source point 1620, which is located at a greater distance from center line 1603 as compared to source point 1610 of FIG. 16A. Second source point 1620 is shown radiating in exemplary diverging paths 1621a and 1622a, which are then bent by lens 1601 into converging paths 1621b and 1622b. Converging paths 1621b and 1622b are shown reconverging at point 1625 in image plane 1602. Notably, point 1625 is located at a greater distance from center line 1603, as compared to source point 1610 of FIG. 16A. Modulo any magnification factor induced by the lens law action, convergence point 1625 is at a location opposite (antipodal), with respect to center line 1603, to the position of source point 1620.

Similarly, FIG. 16C is a side view of third source point 1630, which is located at a still further distance from center line 1603. Third source point 1630 is shown radiating along exemplary diverging paths 1631a and 1632a when are bent by lens 1601 into converging paths 1631b and 1632b Converging paths 1631a and 1632b are shown reconverging at point 1635 in image plane 1602. Note that point 1635 is located at a still greater distance from center line 1603. Modulo any magnification factor induced by the lens law action, the convergence point 1635 is at a location opposite (antipodal), with respect to center line 1603, to the position of the source point 1630.

FIG. 16D is a top view of image 1650, which is shown having a variety of contours 1651, 1652, 1653, and 1654 of constant radial displacement with respect to the image center. It is to be understood that any point on any of the identified contours, which is located in a source plane, such as source plane 1600, will give rise to a point that can only lie within a corresponding contour (modulo magnification) in an image plane, such as image plane 1602. Thus, the path length of a given path from a point on one contour in source plane 1600, through lens 1601, to its reconvergence point in the image plane 1602, is rotationally invariant with respect to lens center line 1603, but is not translationally invariant. Thus induced phase shift of each path will be affected by offsets or shifts in location between the image center line 1603 and the source and image centers.

The fractional Fourier transform model, at least in the case of coherent light or high-energy particle beams, can be thought of as performing the phase accounting as the image evolves through the propagation path. Thus, the classical continuous Fourier transform and its fractionalization match the modeled optics in sharing the notion of a shared zero origin for all images and lenses, while the classical discrete Fourier transform and its fractionalization do not because of the above-described offset in zero origin to the far edge of the transform index range. It is understood that in the foregoing discussion with respect to lenses applies equally to almost any type of quadratic-index media, such as GRIN fiber.

The basis functions used in defining the continuous fractional Fourier transform are the Hermite functions, which are not periodic despite their wiggling behavior—the $n^{th}$ Hermite function has only n zeros (i.e., n axis crossings) and no more. Further, the polynomial amplitude fluctuations of each Hermite function is multiplied by a Gaussian envelope. These non-periodic functions do not have the shift-invariance properties of sines, cosines, and complex exponentials. As a result, and of specific note, the shift rules in the time domain and frequency domain are far more complicated for the fractional Fourier transform than for the classical Fourier transform.

Thus, brute-force application of the same fractionalization approach used in the continuous case to the classical discrete Fourier transform matrix (which does not position time and frequency center at zero as does the continuous case), could create undesirable artifacts resulting from the non-symmetric definition. It is, in effect, similar to defining the continuous fractional Fourier transform by the fractionalization of a "one-sided" continuous classical Fourier transform whose range of integration is from zero to positive infinity rather than from negative infinity to positive infinity. This can be expected to have different results. For example, although it can be shown that pairs of Hermite functions which are both of odd order or both of even order are indeed orthogonal on the half-line, pairs of Hermite functions which are one of odd order and one of even order are not orthogonal on the half-line. As a result, fractionalization of a "one-sided" continuous classical Fourier transform whose range of integration is from zero to positive infinity would not have the full collection of Hermite functions as its basis and hence its fractionalization would have different properties than that of the "two-sided" continuous fractional Fourier transform. However, it is the fractionalization of the "two-sided" continuous classical Fourier transform that matches the optics of lenses and other quadratic phase medium. The fractionalization of a differently defined transform could well indeed not match the optics of lenses and other quadratic phase medium.

Hence, the brute-force application of the same fractionalization approach to the classical discrete Fourier transform matrix (which does not position time and frequency center at zero), could for some implementations be expected to create artifacts resulting from a non-symmetric definition. Some studies have reported that the discrete fractional Fourier transform defined from just such "brute force" direct diagonallization of the classical discrete Fourier transform report pathologies and non-expected results. It may, then, in some implementations, be advantageous—or even essential—to align the zero-origin of the discrete fractional Fourier transform with the zero-origin of the lens action being modeled.

There are a number of ways to define a solution to address this concern. A first class of approaches would be to modify the discrete classical Fourier transform so that its zero-origins are centered with respect to the center of the image prior to fractionalization. This class of approaches would match the discrete transform structure to that of the optics it is used to model. Another class of approaches would be to modify the image so that the optics being modeled matches the zero-origins alignment of the classical discrete Fourier transform matrix, and then proceed with its brute-force fractionalization. Embodiments of the invention provide for either of these approaches, a combination of these approaches, or other approaches which match the zero-origins alignment of a discrete Fourier transform matrix and the image optics being modeled prior to the fractionalization of the discrete Fourier transform matrix.

An exemplary embodiment of the first class of approaches would be to shift the classical discrete Fourier transform to a form comprising symmetry around the zero-time index and the zero-frequency index before fractionalization (utilizing the diagonalization and similarity transformation operations). This results in a "centered" classical fractional Fourier transform, and its fractionalization would result in a "centered" discrete fractional Fourier transform.

The classical discrete Fourier transform, normalized to be a unitary transformation, can be represented as an L-by-L matrix whose element in row p and column q is:

$$DFT_{(L)}(p, q) = \frac{1}{\sqrt{L}} e^{2\pi i(p-1)(q-1)/L} \tag{41}$$

The resulting matrix is depicted in FIG. 15.

The unitary-normalized, classical discrete Fourier transform may be simultaneously shifted in both its original and its frequency indices by k units by simply adding or subtracting the offset variable k for each of those indices:

$$DFT_{(k,L)}(p, q) = \frac{1}{\sqrt{L}} e^{2\pi i(k+p-1)(k+q-1)/L} \tag{42}$$

The shifted transform may be centered by setting k to the midpoint of the index set $\{1, 2, 3, \ldots L\}$. This is done by setting $$k = (L+1)/2. \tag{43}$$

FIG. 17 shows a resulting matrix for the "centered" normalized classical discrete Fourier transform, in which L is taken as an odd integer. In this figure, the matrix is bisected vertically and horizontally by a central row and column of elements having a value of 1. These values correspond to the zero values of the original and frequency indices. It is noted that if L is an even integer, these terms of value 1 will not occur, and in this case there will be no term directly representing a zero frequency nor the original image center.

Due to the reflective aliasing of negative frequency components into higher-index frequency samples, the classical discrete Fourier transform is shifted in such a way towards the indices centers would typically not compromise redundancy and diminished bandwidth due to symmetry around zero as might be expected. As an example, consider an exemplary signal comprising a unit-amplitude cosine wave of frequency 30 offset by a constant of ¼:

$$\cos(2\pi \cdot 30x) + \frac{1}{4} \tag{44}$$

Figure 18A:
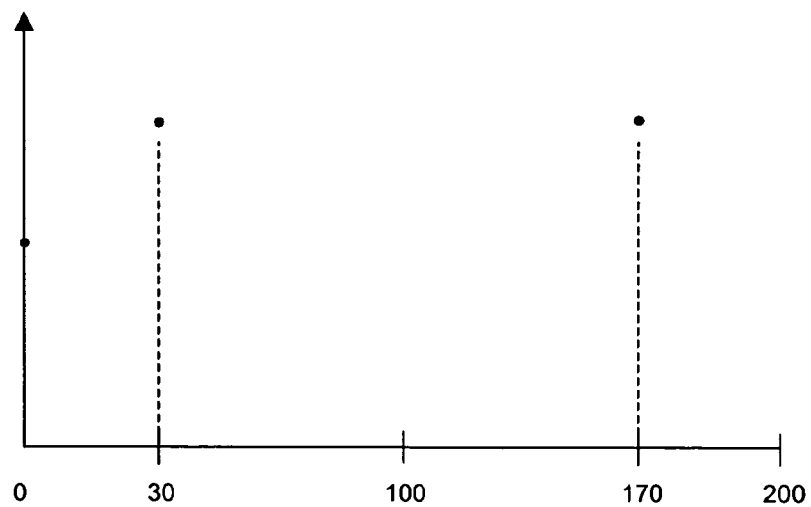
FIG. 18A is a graph showing a frequency-domain output of a non-centered classical discrete Fourier transform for an exemplary signal.

Both the classical discrete Fourier transform and the classical continuous Fourier transform naturally respond to the complex exponential representation, specifically $$\left[\frac{1}{2}e^{i60\pi x} + \frac{1}{2}e^{-i60\pi x}\right] + \frac{1}{4} \tag{45}$$

as is well known to those skilled in the art. In the unshifted (i.e., k=0) case, the classical discrete Fourier transform acts on a signal such as this would produce a frequency-domain output like that depicted in FIG. 18A. In this figure, the classical discrete Fourier transform is shown acting on a signal sampled at 201 sample points $\{0, 1, 2, 3, \ldots, 199, 200\}$. The constant term of ¼ appears at zero frequency (frequency point 1 in the sequence), the positive frequency component ½ $e^{i60\pi x}$ term appears at frequency 30 (frequency point 31 in the sequence) and the negative frequency component ½ $e^{-i60\pi x}$ term is reflected back—through the far edge of the sampling domain at frequency 200 (frequency point 201)—by the aliasing process to a location at frequency 170 (frequency point 171 in the sequence).

Figure 18B:
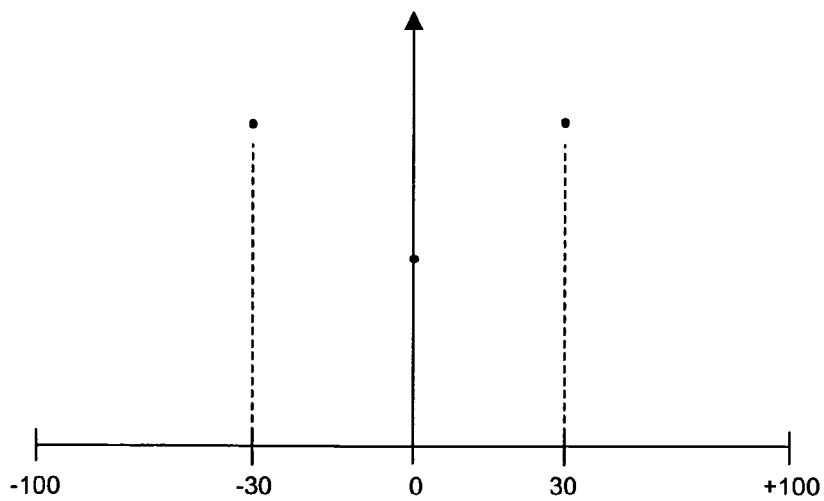
FIG. 18B is a graph showing a frequency-domain output of a centered classical discrete Fourier transform for the same exemplary signal.

In contrast, FIG. 18B illustrates the "centered" classical discrete Fourier transform acting on the same signal. Here the domain of the sampling and frequency indices range from −100 to +100, specifically $\{-100, -199, \ldots -2, -1, 0, 1, 2, \ldots, 99, 100\}$. The constant term of ¼ appears at zero frequency (frequency point 101 in the sequence), the positive frequency component ½ $e^{i60\pi x}$ term appears at frequency 30 (frequency point 131 in the sequence), but here the negative frequency component ½ $e^{-i60\pi x}$ term appears—without aliasing—at frequency −30 (frequency point 71 in the sequence).

This leads to direct interpretations of positive frequency and negative frequency discrete impulses that correspond with positive frequency and negative frequency Dirac delta functions that would appear as the classical continuous Fourier transform. More importantly, this re-configuring of the computational mathematics of the underlying discrete Fourier transform matrix gives a far more analogous fractionalization to that of the continuous fractional Fourier transform than the discrete fractional Fourier transform described in most publications (which are based on the unshifted classical discrete Fourier transform matrix definition). Of course, care must be taken to avoid artifacts created by frequency aliasing effects as would be known to, clear, and readily addressable to one skilled in the well-established art of frequency-domain numerical image processing.

For a monochrome rectangular N×M image X(r,s), the unshifted classical discrete Fourier transform result Y(m,n) is, as is well known to one skilled in the art, given by an expression such as:

$$Y(n, m) = \sum_{s=1}^{N} \sum_{r=1}^{M} DFT_{(M)}(s, M)DFT_{(N)}(r, n)X(r, s) \quad (46)$$

where $DFT_{(L)}(p, q)$ is as given above, though typically normalized by $1/L$ rather than $$\frac{1}{\sqrt{L}}.$$

Incorporating the shift to centered positions of $k_M=(M+1)/2$ and $k_N=(N+1)/2$, one obtains:

$$Y(n, m) = \sum_{s=-\frac{N+1}{2}}^{\frac{N+1}{2}} \sum_{r=-\frac{M+1}{2}}^{\frac{M+1}{2}} DFT_{([M+1]/2,M)}(s, M)DFT_{([N+1]/2,N)}(r, n)X(r, s) \quad (47)$$

Taking the fractional power ($\alpha$) of each unshifted classical discrete Fourier transform matrix as described in previous sections, the overall computation will become:

$$Y(n, m) = \sum_{s=-\frac{N+1}{2}}^{\frac{N+1}{2}} \sum_{r=-\frac{M+1}{2}}^{\frac{M+1}{2}} DFT^{\alpha}_{([M+1]/2,M)}(s, M)DFT^{\alpha}_{([N+1]/2,N)}(r, n)X(r, s) \quad (48)$$

Finally, adapting the image notation to unfocused source image $U(r,s)$ and corrected image $C(m,n)$ yields the overall operation:

$$C(n, m) = \sum_{s=-\frac{N+1}{2}}^{\frac{N+1}{2}} \sum_{r=-\frac{M+1}{2}}^{\frac{M+1}{2}} DFT^{\alpha}_{([M+1]/2,M)}(s, M)DFT^{\alpha}_{([N+1]/2,N)}(r, n)U(r, s) \quad (49)$$

In the more general case, one can leave the centerings $k_M$ and $k_N$ unspecified so that they may be set to zero to obtain the unshifted version, or they may be set to $k_M=(M+1)/2$ and $k_N=(N+1)/2$ to obtain the centered version. Embodiments of the invention provide for both of these as well as other equivalent or analogous formulations. Of course, it is understood by one skilled in the art that all the summing operations above may be readily expressed as matrix and tensor operations, with and within the techniques of fractionalization, iterative computation, reuse of stored and/or precomputed values, handling of color images, etc., may be directly and straightforwardly applied.

The contrasting second class of approaches for aligning the center of the numerical transform and that of the images involves adapting the images to the centering of the numerical transforms. An exemplary embodiment of this second class of approaches could begin with the partition of an original image into, for example, four quadrant images separated by a pair of perpendicular lines that intersect at the center of the original image.

Figure 19:
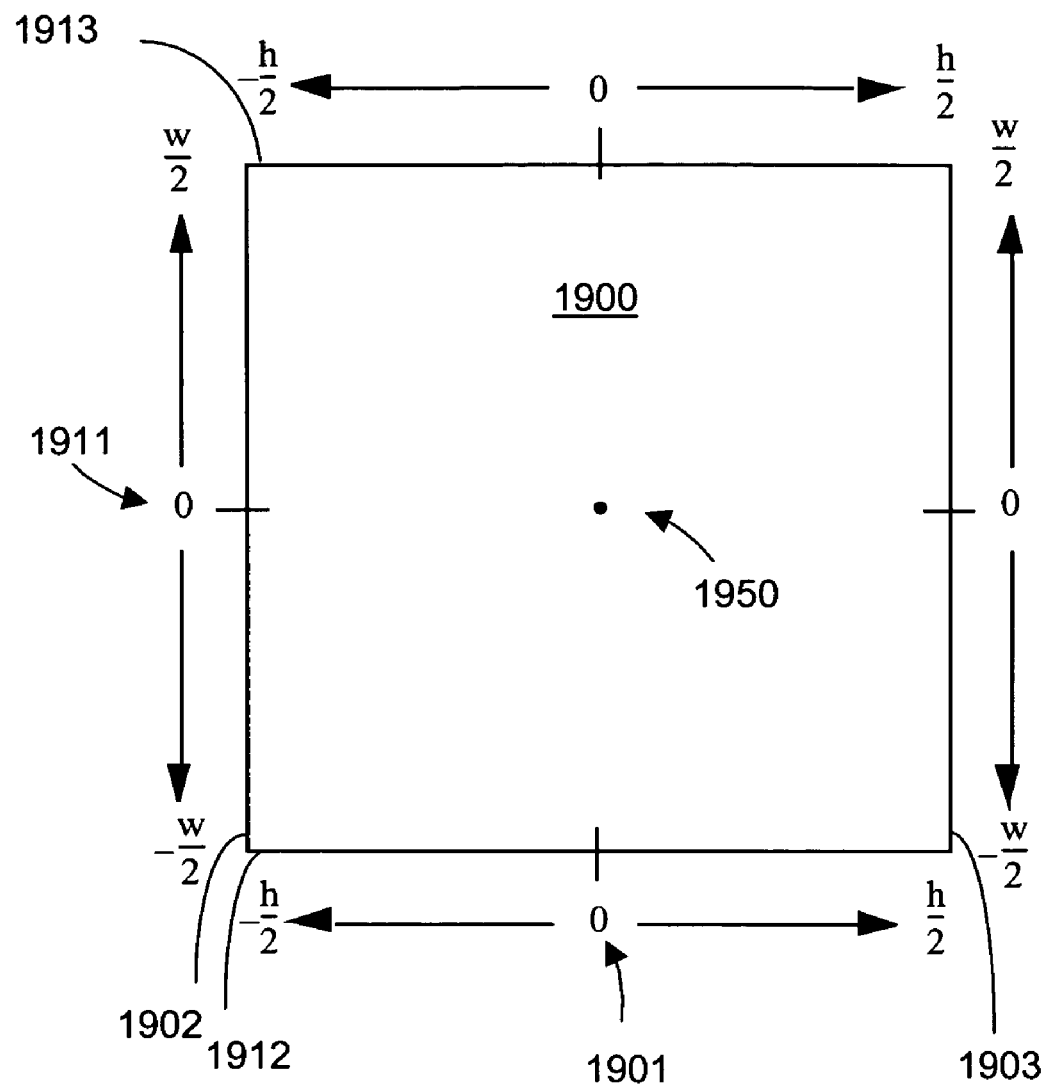
FIG. 19 shows the coordinate indexing of an image having a particular height and width.
Figure 20:
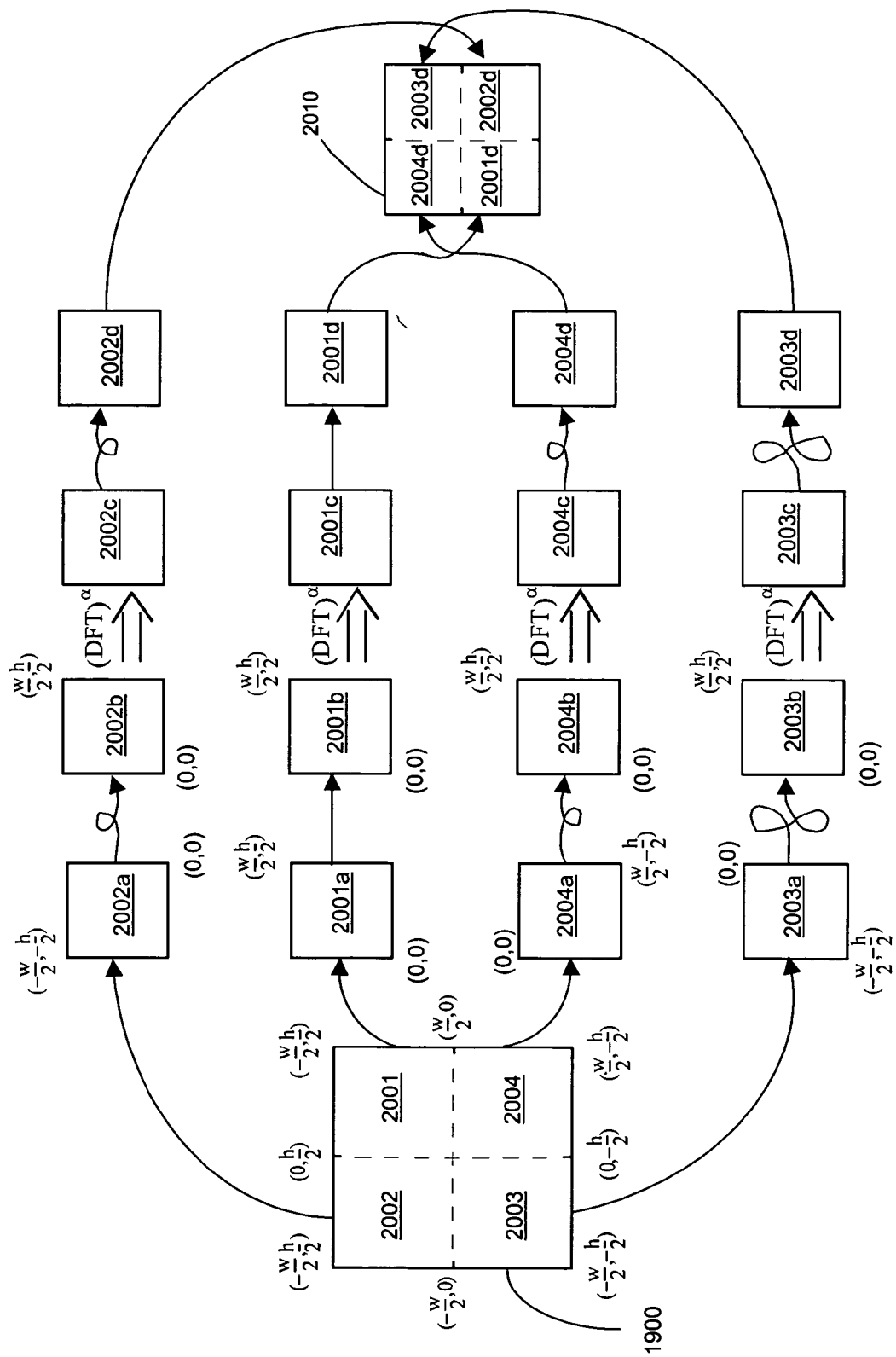
FIG. 20 is a block diagram showing the isolation and later reassembly of quadrant portions of an original image.

Referring now to FIG. 19, image 1900 is shown having height h and width w. The image has a natural center 1950 which corresponds to that of the center line of the lens or equivalent optical element as described above. Vertical edges 1912 and 1913 are indexed with extremes of –h/2 and +h/2 with center index zero as with example element 1901. Similarly, horizontal edges 1902 and 1903 are indexed with extremes of –w/2 and +w/2 with center index zero as with example element 1911. In contrast to the first class of approaches described above, this exemplary embodiment of a second class of approaches utilizes an image which is separated along perpendicular lines into four parts, as illustrated in FIG. 20.

Each of the four distinct quadrant parts 2001, 2002, 2003, and 2004 of the original image 1900 may be treated as an isolated image 2001a, 2002a, 2003a, and 2004a with its own zero-origins in a far corner, matching in abstraction the zero-corner attribute of the discrete classical Fourier transform. The coordinates of the four quadrant images may then be interpreted or realigned, as denoted by blocks 2001b, 2002b, 2003b, and 2004b to match the coordinate system of the discrete classical Fourier transform.

The brute-force fractionalization of the discrete classical Fourier transform can be applied to each of these to obtain four quadrant transformed images, denoted by transformed images 2001c, 2002c, 2003c, and 2004c. The transformed images 2001c, 2002c, 2003c, and 2004c can then be interpretively or operationally realigned and reassembled, resulting in reassembled images 2001d, 2002d, 2003d, and 2004d. The reassembled images 2001d, 2002d, 2003d, and 2004d may then be used to form the larger composite image 2010 that matches the quadrant configuration of the original image 1900. Without undergoing any additional processing, composite image 2010 would typically have edge effects at the quadrant boundaries.

If desired, these edge effects may be resolved, softened, or eliminated by performing additional calculations. For example, a second pair, or more, of perpendicular lines can be used to partition the original image in a manner that differs from that which is shown in FIG. 20 (for example, rotated and/or shifted with respect the original pair). Then, the process shown and described in conjunction with FIG. 20 may then be applied to these distinctly different quadrants as well. The generated calculations may be cross-faded or pre-emphasized and added to produce a composite image with significantly diminished boundary edge-effect artifacts.

Software and Hardware Realizations

Typically, each of the various techniques described herein are invariant of which underlying discrete Fourier transform matrix is fractionalized to define the discrete fractional Fourier transform matrix. Although embodiments of the present invention may be implemented using the exemplary series of operations depicted in the figures, those of ordinary skill in the art will realize that additional or fewer operations may be performed. Moreover, it is to be understood that the order of operations shown in these figures is merely exemplary and that no single order of operation is required. In addition, the various procedures and operations described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof.

For a software implementation, the embodiments described herein may be implemented with modules, such as procedures, functions, and the like, that perform the functions and operations described herein. The software codes can be implemented with a software application written in any suitable programming language and may be stored in a memory unit, such as memory 208 or memory 306, and executed by a processor. The memory unit may be implemented within the processor or external to the processor, in which case it can be communicatively coupled to the processor using known communication techniques. Memory 306 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage device.

The programming language chosen should be compatible with the computing platform according to which the software application is executed. Examples of suitable programming languages include C and C++. The processor may be a specific or general purpose computer such as a personal computer having an operating system such as DOS, Windows, OS/2 or Linux; Macintosh computers; computers having JAVA OS as the operating system; graphical workstations such as the computers of Sun Microsystems and Silicon Graphics, and other computers having some version of the UNIX operating system such as AIX or SOLARIS of Sun Microsystems; or any other known and available operating system, or any device including, but not limited to, laptops and hand-held computers.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

REFERENCES CITED

The following references are cited herein:

[1] L. Levi, *Applied Optics*, Volume 2 (Section 19.2), Wiley, New York, 1980;

[2] J. W. Goodman, *Introduction to Fourier Optics*, McGraw-Hill, New York, 1968;

[3] K. Iizuka, *Engineering Optics*, Second Edition, Springer-Verlag, 1987;

[4] A. Papoulis, *Systems and Transforms with Applications in Optics*, Krieger, Malabar, Fla., 1986;

[5] L. F. Ludwig, "General Thin-Lens Action on Spatial Intensity (Amplitude) Distribution Behaves as Non-Integer Powers of Fourier Transform," *Spatial Light Modulators and Applications Conference*, South Lake Tahoe, 1988;

[6] R. Dorsch, "Fractional Fourier Transformer of Variable Order Based on a Modular Lens System," in *Applied Optics*, vol. 34, no. 26, pp. 6016–6020, September 1995;

[7] E. U. Condon, "Immersion of the Fourier Transform in a Continuous Group of Functional Transforms," in *Proceedings of the National Academy of Science*, vol. 23, pp. 158–161, 1937;

[8] V. Bargmann, "On a Hilbert Space of Analytical Functions and an Associated Integral Transform," Comm. Pure Appl. Math, Volume 14, 1961, 187–214;

[9] V. Namias, "The Fractional Order Fourier Transform and its Application to Quantum Mechanics," in *J. of Institute of Mathematics and Applications*, vol. 25, pp. 241–265, 1980;

[10] B. W. Dickinson and D. Steiglitz, "Eigenvectors and Functions of the Discrete Fourier Transform," in *IEEE Transactions on Acoustics, Speech, and Signal Processing*, vol. ASSP-30, no. 1, February 1982;

[11] F. H. Kerr, "A Distributional Approach to Namias' Fractional Fourier Transforms," in *Proceedings of the Royal Society of Edinburgh*, vol. 108A, pp. 133–143, 1983;

[12] F. H. Kerr, "On Namias' Fractional Fourier Transforms," in *IMA J. of Applied Mathematics*, vol. 39, no. 2, pp. 159–175, 1987;

[13] P. J. Davis, *Interpolation and Approximation*, Dover, N.Y., 1975;

[14] N. I. Achieser, *Theory of Approximation*, Dover, N.Y., 1992;

[15] G. B. Folland, *Harmonic Analysis in Phase Space*, Princeton University Press, Princeton, N.J., 1989;

[16] N. N. Lebedev, *Special Functions and their Applications*, Dover, N.Y., 1965;

[17] N. Wiener, *The Fourier Integral and Certain of Its Applications*, (Dover Publications, Inc., New York, 1958) originally Cambridge University Press, Cambridge, England, 1933;

[18] S. Thangavelu, *Lectures on Hermite and Laguerre Expansions*, Princeton University Press, Princeton, N.J., 1993;

[19] "Taking the Fuzz out of Photos," *Newsweek, Volume CXV, Number 2*, Jan. 8, 1990; and

[20] Jahne, Bernd, *Digital Image Processing—Concepts, Algorithms, and Scientific Applications*, Springer-Verlag, New York, 1991.

What is claimed is:

1. A method for approximating the evolution of images propagating through a physical medium by calculating a fractional power of a numerical operator, said numerical operator being defined by said physical medium and comprising a diagonalizable numerical linear operator raised to a power ($\alpha$), said method comprising:

(a) representing a plurality of images using an individual data array for each of said plurality of images;

(b) representing said numerical operator with a linear operator formed by multiplying an ordered similarity transformation operator (P) by a correspondingly-ordered diagonal operator ($\Lambda$), the result of which is multiplied by an approximate inverse ($P^{-1}$) of said ordered similarity transformation operator (P);

(c) raising diagonal elements of said correspondingly-ordered diagonal operator ($\Lambda$) to said power ($\alpha$) to produce a fractional power diagonal operator;

(d) multiplying said fractional power diagonal operator by an approximate inverse of said ordered similarity transformation operator ($P^{-1}$) to produce a first partial result;
(e) multiplying a data array of one of said plurality of images by said ordered similarity transformation operator (P) to produce a modified data array;
(f) multiplying said modified data array by said first partial result to produce said fractional power of said numerical operator; and
(g) repeating operations (e) and (f) for each of said plurality of images.

2. The method according to claim 1, wherein said data array, for each of said plurality of images, is a vector.

3. The method according to claim 1, wherein said data array, for each of said plurality of images, is a matrix.

4. The method according to claim 3, wherein each of said plurality of matrices represent a monochrome image.

5. The method according to claim 3, wherein each of said plurality of matrices represent a luminance component of a represented image.

6. The method according to claim 3, wherein each of said plurality of matrices represent a chroma component of a represented image.

7. The method according to claim 1, wherein said data array, for each of said plurality of images, is a tensor.

8. The method according to claim 7, wherein each of said plurality of tensors represent a color image.

9. The method according to claim 1, wherein said numerical operator comprises a representation of a discrete Fourier transform.

10. The method according to claim 9, wherein said discrete Fourier transform comprises a one-dimensional transformation acting on vectors.

11. The method according to claim 9, wherein said discrete Fourier transform comprises a two-dimensional transformation acting on matrices.

12. The method according to claim 11, wherein said two-dimensional discrete Fourier transform is represented as a tensor product of two one-dimensional discrete Fourier transforms, wherein a first one of said two one-dimensional discrete Fourier transforms is uniquely associated with rows of said data array, and a second one of said two one-dimensional discrete Fourier transforms is uniquely associated with columns of said data array.

13. The method according to claim 1, wherein said numerical operator comprises a matrix.

14. The method according to claim 13, wherein said ordered similarity transformation operator (P) comprises an array formed from eigenvectors of said numerical operator.

15. The method according to claim 14, wherein said correspondingly-ordered diagonal operator ($\Lambda$) comprises a diagonal matrix of eigenvalues corresponding to said eigenvectors which are arranged in corresponding order relative to said eigenvalues.

16. The method according to claim 1, wherein said multiplying accomplished in operations (b), (d), (e), and (f) is accomplished using matrix multiplication.

17. The method according to claim 1, wherein said numerical operator comprises a tensor.

18. The method according to claim 1, wherein said ordered similarity transformation operator (P) comprises a matrix.

19. The method according to claim 1, wherein said multiplying of said approximate inverse of said ordered similarity transformation operator and said correspondingly-ordered diagonal operator is realized by multiplying each column of said ordered similarity transformation operator by a value of a diagonal element of a corresponding row of said correspondingly-ordered diagonal operator.

20. The method according to claim 1, wherein said numerical operator comprises a zero origin which matches a zero origin of each of said plurality of images.

21. The method according to claim 20, said method further comprising:
shifting an index of said numerical operator so that said zero origin of said numerical operator matches said zero origin of each of said plurality of images.

22. The method according to claim 20, wherein said plurality of images form a composite image.

23. A method for approximating the evolution of images propagating through a physical medium by calculating a fractional power of a numerical operator, said numerical operator being defined by said physical medium and comprising a diagonalizable numerical linear operator raised to a power ($\alpha$) having any one of a plurality of values, said method comprising:
(a) representing an image using a data array;
(b) representing said numerical operator with a linear operator formed by multiplying an ordered similarity transformation operator (P) by a correspondingly-ordered diagonal operator ($\Lambda$), the result of which is multiplied by an approximate inverse ($P^{-1}$) of said ordered similarity transformation operator (P);
(c) raising diagonal elements of said correspondingly-ordered diagonal operator ($\Lambda$) to one of said plurality of values of said power ($\alpha$) to produce a fractional power diagonal operator;
(d) multiplying said fractional power diagonal operator by an approximate inverse of said ordered similarity transformation operator ($P^{-1}$) to produce a first partial result;
(e) multiplying said data array by said ordered similarity transformation operator (P) to produce a modified data array;
(f) multiplying said modified data array by said first partial result to produce said fractional power of said numerical operator; and
(g) repeating operations (c) and (d) for each of said plurality of values of said power ($\alpha$).

24. The method according to claim 23, wherein said data array, for each of said plurality of images, is a vector.

25. The method according to claim 23, wherein said data array, for each of said plurality of images, is a matrix.

26. The method according to claim 25, wherein each of said plurality of matrices represent a monochrome image.

27. The method according to claim 25, wherein each of said plurality of matrices represent a luminance component of a represented image.

28. The method according to claim 25, wherein each of said plurality of matrices represent a chroma component of a represented image.

29. The method according to claim 23, wherein said data array, for each of said plurality of images, is a tensor.

30. The method according to claim 29, wherein each of said plurality of tensors represent a color image.

31. The method according to claim 23, wherein said numerical operator comprises a representation of a discrete Fourier transform.

32. The method according to claim 31, wherein said discrete Fourier transform comprises a one-dimensional transformation acting on vectors.

33. The method according to claim 31, wherein said discrete Fourier transform comprises a two-dimensional transformation acting on matrices.

34. The method according to claim 33, wherein said two-dimensional discrete Fourier transform is represented as a tensor product of two one-dimensional discrete Fourier transforms, wherein a first one of said two one-dimensional discrete Fourier transforms is uniquely associated with rows of said data array, and a second one of said two one-dimensional discrete Fourier transforms is uniquely associated with columns of said data array.

35. The method according to claim 23, wherein said numerical operator comprises a matrix.

36. The method according to claim 35, wherein said ordered similarity transformation operator (P) comprises an array formed from eigenvectors of said numerical operator.

37. The method according to claim 36, wherein said correspondingly-ordered diagonal operator ($\Lambda$) comprises a diagonal matrix of eigenvalues corresponding to said eigenvectors which are arranged in corresponding order relative to said eigenvalues.

38. The method according to claim 23, wherein said multiplying accomplished in operations (b), (d), (e), and (f) is accomplished using matrix multiplication.

39. The method according to claim 23, wherein said numerical operator comprises a tensor.

40. The method according to claim 23, wherein said ordered similarity transformation operator (P) comprises a matrix.

41. The method according to claim 23, wherein said multiplying of said approximate inverse of said ordered similarity transformation operator and said correspondingly-ordered diagonal operator is realized by multiplying each column of said ordered similarity transformation operator by a value of a diagonal element of a corresponding row of said correspondingly-ordered diagonal operator.

42. The method according to claim 23, wherein said numerical operator comprises a zero origin which matches a zero origin of said image.

43. The method according to claim 42, said method further comprising:
shifting an index of said numerical operator so that said zero origin of said numerical operator matches said zero origin of said image.

44. The method according to claim 42, wherein said image is one portion of a composite image.

45. A computer-readable medium containing instructions for controlling a computer system to approximate the evolution of images propagating through a physical medium by calculating a fractional power of a numerical operator, said numerical operator being defined by said physical medium and comprising a diagonalizable numerical linear operator raised to a power ($\alpha$), said controlling provided by said computer system being accomplished according to operations comprising:
(a) representing a plurality of images using an individual data array for each of said plurality of images;
(b) representing said numerical operator with a linear operator formed by multiplying an ordered similarity transformation operator (P) by a correspondingly-ordered diagonal operator ($\Lambda$), the result of which is multiplied by an approximate inverse ($P^{-1}$) of said ordered similarity transformation operator (P);
(c) raising diagonal elements of said correspondingly-ordered diagonal operator ($\Lambda$) to said power ($\alpha$) to produce a fractional power diagonal operator;
(d) multiplying said fractional power diagonal operator by an approximate inverse of said ordered similarity transformation operator ($P^{-1}$) to produce a first partial result;
(e) multiplying a data array of one of said plurality of images by said ordered similarity transformation operator (P) to produce a modified data array;
(f) multiplying said modified data array by said first partial result to produce said fractional power of said numerical operator; and
(g) repeating operations (e) and (f) for each of said plurality of images.

46. A computer-readable medium containing instructions for controlling a computer system to approximate the evolution of images propagating through a physical medium by calculating a fractional power of a numerical operator, said numerical operator being defined by said physical medium and comprising a diagonalizable numerical linear operator raised to a power ($\alpha$) having any one of a plurality of values, said controlling provided by said computer system being accomplished according to operations comprising:
(a) representing an image using a data array;
(b) representing said numerical operator with a linear operator formed by multiplying an ordered similarity transformation operator (P) by a correspondingly-ordered diagonal operator ($\Lambda$), the result of which is multiplied by an approximate inverse ($P^{-1}$) of said ordered similarity transformation operator (P);
(c) raising diagonal elements of said correspondingly-ordered diagonal operator ($\Lambda$) to one of said plurality of values of said power ($\alpha$) to produce a fractional power diagonal operator;
(d) multiplying said fractional power diagonal operator by an approximate inverse of said ordered similarity transformation operator ($P^{-1}$) to produce a first partial result;
(e) multiplying said data array by said ordered similarity transformation operator (P) to produce a modified data array;
(f) multiplying said modified data array by said first partial result to produce said fractional power of said numerical operator; and
(g) repeating operations (c) and (d) for each of said plurality of values of said power ($\alpha$).

* * * * *